US005804804A

United States Patent [19]

Fukatsu et al.

[11] Patent Number: 5,804,804

[45] Date of Patent: Sep. 8, 1998

[54] DEVICE FOR SUPPLYING AND RECEIVING MEDIUM BETWEEN A PLURALITY OF APPARATUSES, CASH TRANSACTION SYSTEM WITH THE DEVICE, AND METHOD OF SUPPLYING AND RECEIVING THE MEDIUM

[75] Inventors: Kunio Fukatsu; Nobuhiko Matsukawa, both of Yokohama; Shigeo Aoyagi, Hino, all of Japan

[73] Assignees: Kabushiki Kaisha Toshiba, Kawasaki; Hirose Electronic System Co., Ltd., Tokyo, both of Japan

[21] Appl. No.: 633,447

[22] Filed: Apr. 17, 1996

[30] Foreign Application Priority Data

Apr. 19, 1995 [JP] Japan .................................... 7-093851
Jul. 31, 1995 [JP] Japan .................................... 7-194694

[51] Int. Cl.$^{6}$ ...................................................... G06F 17/60

[52] U.S. Cl. .......................... 235/379; 235/385; 235/486; 902/17; 414/273; 271/162; 186/37; 180/6.48; 180/169

[58] Field of Search .................................... 235/379, 385, 235/486; 902/8, 9, 10, 12, 13, 17; 414/273, 789.7; 271/3.01, 162; 186/37; 180/6.48, 6.5, 167, 168, 169; 901/1

[56] References Cited

U.S. PATENT DOCUMENTS

| | | | |
|---|---|---|---|
| 4,524,268 | 6/1985 | Fukatsu | 235/379 |
| 4,577,763 | 3/1986 | Placke et al. | 235/379 X |
| 4,775,783 | 10/1988 | Sasaki et al. | 235/379 |
| 4,800,977 | 1/1989 | Boegli et al. | 180/168 |
| 4,844,493 | 7/1989 | Kramer | 180/169 |
| 4,866,254 | 9/1989 | Okayama et al. | 235/379 |
| 4,986,378 | 1/1991 | Kasper | 180/6.48 |
| 5,280,431 | 1/1994 | Summerville et al. | 180/168 X |
| 5,312,219 | 5/1994 | Brown | 180/6.48 X |
| 5,313,050 | 5/1994 | Hiroki et al. | 235/379 |
| 5,395,199 | 3/1995 | Day, III et al. | 180/168 X |
| 5,434,490 | 7/1995 | Ishida et al. | 180/168 X |
| 5,510,984 | 4/1996 | Markin et al. | 180/168 X |
| 5,593,149 | 1/1997 | Kimura et al. | 235/379 X |

FOREIGN PATENT DOCUMENTS

| | | |
|---|---|---|
| 30-01-146-A1 | 7/1981 | Germany . |
| 56-4868 | 1/1981 | Japan . |
| 1-298904 | 12/1989 | Japan . |
| 2-16607 | 1/1990 | Japan . |
| 2-69806 | 3/1990 | Japan . |
| 2-158809 | 6/1990 | Japan . |
| 5-85953 | 12/1993 | Japan . |

*Primary Examiner*—Donald T. Hajec
*Assistant Examiner*—Michael G. Lee
*Attorney, Agent, or Firm*—Cushman Darby & Cushman IP Group of Pillsbury Madison & Sutro LLP

[57] ABSTRACT

A device for supplying and receiving to and from a plurality of automatic teller machines installed side by side on an installation surface has a carrier station for transmitting, over a wireless channel, an instruction signal for designating an automatic teller machine for cash receipt and delivery, and a cassette carrier capable of running to the designated automatic teller machine. The cassette carrier has a carrier body equipped with a power source and a running mechanism, and a transport cassette placed on the carrier for holding the cash therein. In accordance with the instruction signal and a result of detection by a position sensor, the cassette carrier runs to a predetermined position facing the designated automatic teller machine and is positioned with respect to the designated automatic teller machine. In this state, cash are transferred between the transport cassette and the designated automatic teller machine by a transfer mechanism provided on the movable carrier.

10 Claims, 13 Drawing Sheets

DEVICE FOR SUPPLYING AND RECEIVING MEDIUM BETWEEN A PLURALITY OF APPARATUSES, CASH TRANSACTION SYSTEM WITH THE DEVICE, AND METHOD OF SUPPLYING AND RECEIVING THE MEDIUM

BACKGROUND OF THE INVENTION

1. Field of the Invention

The present invention relates to a device for supplying and receiving a medium to be handled to and from a plurality of apparatuses, a cash transaction system equipped with the device, and a method for supplying and receiving the medium.

2. Description of the Related Art

In financial institutions etc., automatic teller machines (hereinafter referred to as ATMS) have been widely distributed. ATMS can automatically pay and transfer, for example, cash to clients, and more and more apparatuses have been installed. Further, along with ATMs, cash input/output apparatuses for automatically handling cash and cash receiving/dispensing sorters, etc., have been widely used in various installation sites.

Depending upon the situations under which the ATM is needed, it is necessary to replenish cash in the ATM and withdraw the cash from the ATM. Conventionally, such replenishing and withdrawing have been manually made by attendants. In the case where a larger number of ATMs are installed in the installation site, greater time and labor are required in replenishing and withdrawing the cash.

In the recent years, a cash transaction system has been proposed having a plurality of ATMs and a supplying/receiving apparatus for automatically replenishing and withdrawing bills, coins, etc., into and out of the respective ATMs.

According to the cash transaction system, the supplying/receiving apparatus is comprised of a carrier automatically running between many ATMs and cash receiving/dispensing apparatuses, and a cash supplying/receiving mechanism. As the cash supplying/receiving mechanism, proposals have been made to provide a type of detachably fitting, for example, a cassette storing bills into a bill storage section of the ATM side and a type of allowing such a cassette to replenish or withdraw bills into and out of the bill storage section of the ATMs one by one.

In the case where there is an exchange of cassettes or a transfer of bills, it is necessary to accurately position the supplying/receiving apparatus relative to the ATMs. For this reason, rails or traveling tapes are normally arranged in a predetermined position relative to many ATMs and the cash receiving/dispensing apparatuses and the carrier is run along the rails or the traveling tapes.

According to this method using the rails or tapes, however, it is necessary to install these on the floor surface of the financial institution, etc., and to linearly and accurately arrange a plurality of ATMs, or the cash receiving/dispensing sorter, relative to the rails or traveling tapes. For this reason, the installation site of the cash transaction system is restricted and, in addition, their installation is also cumbersome and a resultant system becomes larger in its full scale.

Further, in the case where the ATMs are inspected for the maintenance, etc., internal units have to be taken out of the respective ATMs and, in this case, such operations are difficult due to the presence of the rails.

SUMMARY OF THE INVENTION

The present invention has been contrived in consideration of the above circumstances, and its object is provide a medium supplying/receiving device being relatively compact and easier to install, without the need to provide any rails, running tapes, etc., and being accurately positioned relative to associated apparatuses, a cash transaction system using the medium supplying/receiving apparatus, and a medium supplying/receiving method.

In order to achieve the above-mentioned object, a medium supplying/receiving device of the present invention comprises means for transmitting, over a wireless channel, an instruction signal for designating any given one of a plurality of associated apparatuses installed side by side on an installation surface and each having an insertion opening through which the medium to be handled passes; and a movable carrier for supplying and receiving the medium to and from the designated associated apparatus in accordance with the instruction signal.

The movable carrier comprises a carrier body having a running mechanism and a drive source for driving the running mechanism, and capable of running along any path on the installation surface; detecting means for detecting the position of the movable carrier relative to the associated apparatus, a medium holding section provided on the carrier body, for holding the medium therein, medium supplying/receiving means provided on the carrier body, for allowing the medium holding section to supply and receive the medium to and from the associated apparatus through the insertion opening; and control means for operating the drive source in accordance with the result of detection by the detecting means and the instruction signal to allow the movable carrier to be positioned relative to the designated apparatus and for operating the medium supplying/receiving means.

Further, a cash transaction system of the present invention has a plurality of automatic teller machines arranged side by side on the installation surface and each having a cash storage section for storing cash and an insertion opening through which the cash is supplied and withdrawn, and a medium supplying/receiving device for supplying and receiving the cash to and from the automatic teller machines.

The medium supplying/receiving device comprises means for transmitting, over a wireless channel, an instruction signal for designating a given automatic teller machine to and from which the cash is supplied and received, and a movable carrier for supplying and receiving the cash to and from the designated automatic teller machine in accordance with the instruction signal. The movable carrier has a carrier body having a running mechanism and a drive source for driving the running mechanism and capable of running along any path on the installation surface; detecting means for detecting the position of the movable carrier relative to the automatic teller machine; a medium holding section provided on the carrier body, for holding the medium therein; cash supplying/receiving means provided on the carrier body for allowing the cash holding section to supply and receive the case to and from the cash holding section of the automatic transaction machine through the insertion opening; and control means for operating the drive source in accordance with a result of detection by the detecting means and instruction signal to allow the movable carrier to be positioned relative to the automatic teller machine and for operating the supplying/receiving means.

According to the supplying/receiving device and cash transaction system so arranged, when an instruction signal is transmitted from the transmitting means, the running mechanism is operated by the driving source under control of the control means to allow the movable carrier to run to an associated apparatus, or the automatic teller machine, designated by the instruction signal. At this time, the position of the movable carrier relative to the associated apparatus or the automatic teller machine is detected by the detecting means of the movable carrier and the movable carrier is positioned to a predetermined position relative to the apparatus or the automatic teller machine.

Then, the medium holding section holding the medium, such as the cash, therein is loaded by the supplying/receiving means into the associated apparatus or the automatic teller machine through the insertion opening to allow the medium holding section to supply and receiving the medium to and from the associated apparatus or the automatic teller machine.

Thereafter, in accordance with an instruction signal from the transmitting means, the movable carrier runs to a predetermined position relative to another associated apparatus or another automatic teller machine, and the supplying/receiving means transfers media between the medium holding section and that apparatus or that automatic teller machine.

Further, a medium supplying/receiving device according to the present invention comprises a movable carrier capable of running along any path on the installation surface on which a plurality of associated apparatuses for transacting the medium are installed. The movable carrier comprises a carrier body having a pair of independently rotatable drive wheels; driving means provided on the carrier body for rotating the drive wheels in the same direction to run the movable carrier linearly and for rotating the drive wheels in those directions opposite to each other to rotate the movable carrier at a predetermined position; measuring means for measuring a distance and inclination of the movable carrier relative to a measuring target surface, the measuring means having a pair of distance measuring sections which are spaced apart from each other in the running direction of the carrier body in a plane substantially perpendicular to the installation surface; control means for operating the driving means to allow the movable carrier to run to a position facing any given apparatus, and for positioning the movable carrier in a predetermined stop position by detecting an amount of displacement of the movable carrier relative to the predetermined stop position in accordance with the distance and inclination of the movable carrier to the associated apparatus measured by the distance measuring section and by correcting the displacement by allowing the movable carrier to rotate and linearly run by the driving means on the basis of the amount of displacement; and supplying/receiving means provided on the carrier body for allowing the movable carrier which is positioned to the predetermined stop position to supply and receive the medium to and from the associated apparatus.

A cash transaction system of the present invention has a plurality of apparatuses arranged on an installation surface and each handling a medium to be handled, and a supplying/receiving device for supplying and receiving the medium to and from the plurality of apparatuses. The supplying/receiving device has means for transmitting, over a wireless channel, an instruction signal for designating the apparatus for supplying and receiving the medium, and a movable carrier capable of running on the installation surface in accordance with the instruction signal and supplying and receiving the medium to and from the associated apparatus. The movable carrier comprises a carrier body having a pair of independently rotatable drive wheels; driving means provided on the carrier body for rotating the drive wheels in the same direction to run the movable carrier linearly and for rotating the drive wheels in those directions opposite to each other to rotate the movable carrier at a predetermined position; measuring means for measuring a distance and inclination of the movable carrier relative to a measuring target surface, the measuring means having a pair of distance measuring sections which are spaced apart from each other in the running direction of the carrier body in a plane substantially perpendicular to the installation surface; control means for operating the driving means to allow the movable carrier to run to a position facing any given apparatus, and for positioning the movable carrier in a predetermined stop position by detecting an amount of displacement of the movable carrier relative to the predetermined stop position in accordance with the distance and inclination of the movable carrier to the associated apparatus measured by the distance measuring section and by correcting the displacement by allowing the movable carrier to rotate and linearly run by the driving means on the basis of the amount of displacement; and supplying/receiving means provided on the carrier body for allowing the movable carrier which is positioned to the predetermined stop position to supply and receive the medium to and from the associated apparatus.

A method of supplying and receiving medium of the present invention comprises the steps of: preparing a movable carrier capable of linearly and curvilinearly running along at any path on an installation surface; and storing data indicating a predetermined stop position relative to the respective apparatus arranged on the installation surface in the movable carrier. The method further comprises transmitting, over a wireless channel, an instruction signal for designating a given apparatus to which a medium is to be supplied to the movable carrier and allowing the movable carrier to run to a predetermined position relative to the designated associated apparatus; and measuring a distance and inclination of the movable carrier relative to the apparatus by distance measuring sections provided on the movable carrier run to the predetermined position and detecting an amount of displacement of the movable carrier relative to the predetermined stop position on the basis of the measured distance and inclination. The method further comprises finding an initially set correction value suitable for the detected displacement amount, correcting the displacement of the movable carrier by allowing the movable carrier to linearly run, while rotating at the predetermined position, in accordance with the correction value and, thereafter, allowing the movable carrier to supplying and receiving the medium to and from the apparatus.

According to the supplying/receiving apparatus thus arranged, cash transaction system and, method of supplying/receiving medium, the movable carrier has its drive wheels driven under control of the controlling means and runs to a predetermined stop position facing the any given apparatus. Then the distance and inclination of the movable carrier relative to the apparatus are measured by the distance measuring sections on the movable carrier and the displacement amount of the movable carrier relative to the predetermined stop position is detected based on the measured data.

In the case where the movable carrier is displaced from the predetermined stop position, the drive wheels are operated, under control of the controlling means, in accordance with the detected displacement amount to allow the displacement amount of the movable carrier to be corrected by rotating at a predetermined position and linearly running so that the movable carrier is positioned to the above-mentioned predetermined stop position.

Thereafter, the medium, such as the cash, is supplied and received by the supplying/receiving means between the movable carrier and the associated apparatus and then the movable carrier runs to a predetermined stop position facing another associated apparatus to allow it to supply and receive the medium to and from that apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 1 to 15F show a cash transaction system according to an embodiment of the present invention, in which:

FIG. 1 is a perspective view schematically showing the cash transaction system as a whole, FIG. 2 is an enlarged, perspective view showing automatic teller machines and a supplying/receiving device in the cash transaction system, FIG. 3 is a perspective view showing an outer appearance of the an automatic teller machine, FIG. 4 is a block diagram schematically showing a whole arrangement of the cash transaction system.

FIG. 6 is a plan view showing a carrier for the cassette carrier;

FIG. 7 is a side view, partly removed away, showing the carrier;

FIG. 8 is a front view showing a transport cassette, slide mechanism and fine adjustment mechanism in the cassette carrier;

FIG. 9 is a perspective view diagrammatically showing part of the fine adjustment mechanism;

FIG. 10 is a plan view showing a drive section of the slide mechanism;

FIG. 11 is a block diagram schematically showing an arrangement of the cassette carrier as a whole;

FIG. 12 is a diagrammatic view for explaining a positioning process of the cassette carrier relative to the automatic teller machines;

FIG. 13 is a plan view showing a state in which the cassette carrier is stopped to a position displaced off a predetermined position;

FIG. 14 is a flow chart showing a correction operation of correcting a positional displacement of the cassette carrier; and FIG. 15A to 15F are plan views showing a correction operation of correcting a positional displacement of the cassette carrier.

DETAILED DESCRIPTION OF THE PREFERRED EMBODIMENTS

An embodiment of the present invention will be explained with reference to the accompanying drawings.

Figure 1:
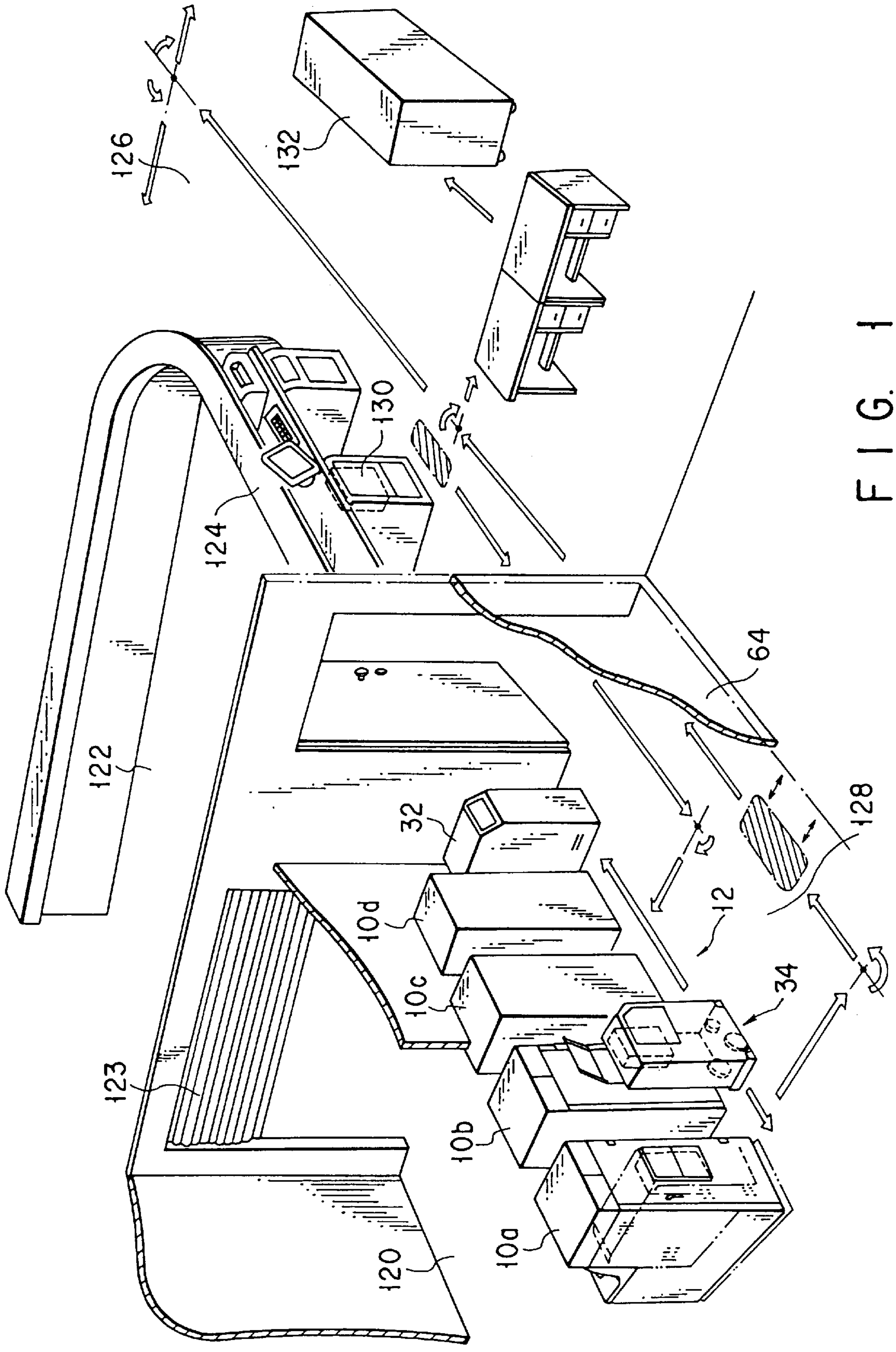

FIG. 1 is a schematic view showing an arrangement of a whole cash transaction system installed as a transaction system of the present invention at the business place of a financial institution.

The business place comprises a cash corner 120 with, for example, four automatic teller machines (hereinafter referred to as ATMS) installed for non-attendant transactions, a lobby 122 for offering services to clients during business hours, a teller counter 124 provided opposite to the lobby, a business support area 126 supporting the business of clerks behind the teller counter, a machine room 128 provided behind the back side of the ATMs and operated by operators, a cash box, not shown, and so on. A shutter 123 is provided in a path connecting the cash corner 120 to the lobby 122 and adapted to be closed when the business hours are ended. The structures of such business places vary depending upon the size of the building or the outline of rooms involved.

At their respective departments or areas, various cash transaction apparatus are installed to handle cash as media to be handled. As the cash transaction apparatus, there are provided four ATMs 10*a*, 10*b*, 10*c* and 10*d*, front-side cash input/output apparatus 130 at the teller counter 124, and a cash receiving/dispensing sorter 132 installed at the business support area 126.

The cash transaction system is equipped with a cash supplying/receiving device 12 for replenishing the cash, in particular, bills, to and withdrawing them from the cash transaction apparatuses.

Figure 2:
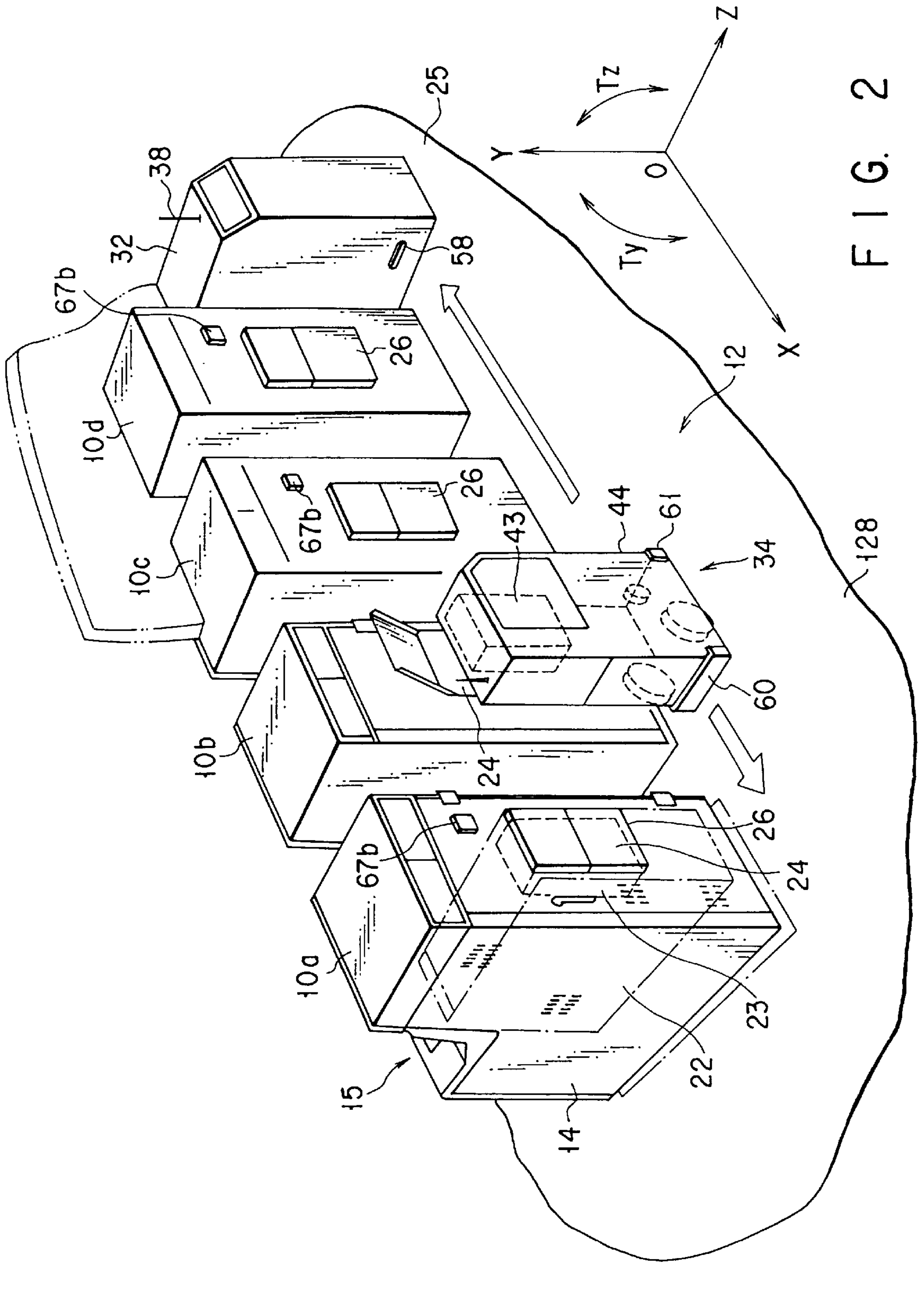
Figure 3:
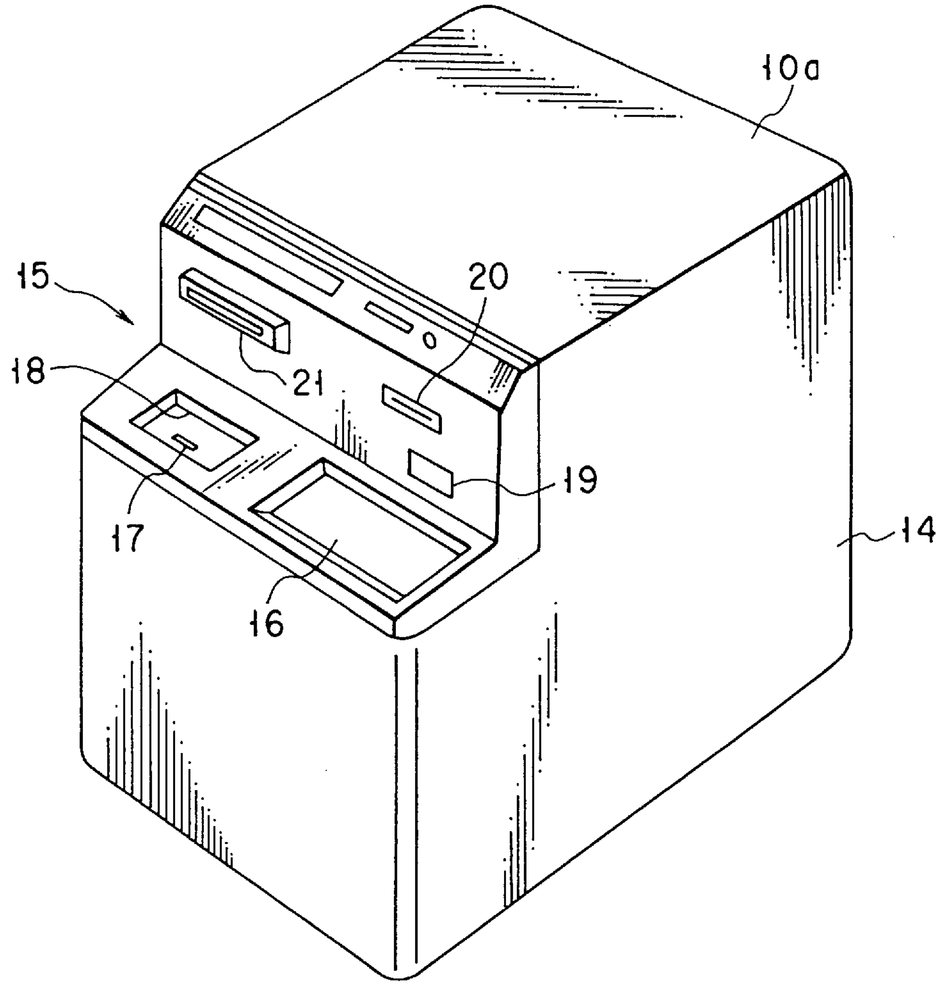

As shown in FIGS. 2 and 3, the ATM 10*a* has a substantially rectangular box-like housing 14, and a client access panel 15 is provided on the front face of the housing on the cash corner 120 side and accessed by the client. The client access panel 15 includes a display section 16 serving also as a touch panel, a bill receiving/dispensing opening 18 opened and closed by a door 17, a coin receiving/dispensing inlet 19, a card insertion slot 20, a passbook insertion slot, etc.

In the housing 14 are arranged a bill handling apparatus 22 for receiving bills from, and dispensing them to, the client, and a coin handling apparatus, etc., not shown. The bill handling apparatus 22 and coin handling apparatus constitute a cash storage section. Further, at the back surface side of the housing 14 located on the machine room 128 side, an insertion opening 24 is provided opposite a cassette loading section 23 of the bill handling apparatus 22 and adapted to be opened and closed by a door 26 which is movable upwardly and downwardly.

It is to be noted that the ATMs 10*b*, 10*c* and 10*d* are so constructed as set out above in connection with the above-mentioned ATM 10*a*. The ATMs 10*a* to 10*d* are installed side-by-side on a floor surface 25 of the business place with their back surfaces arranged in parallel alignment. Further, the front-side cash input/output apparatuses 130 and cash receiving/dispensing sorter 132 are also so constructed that each includes a cash storage section and an insertion opening, not shown, leading to the cash storage section.

Figure 4:
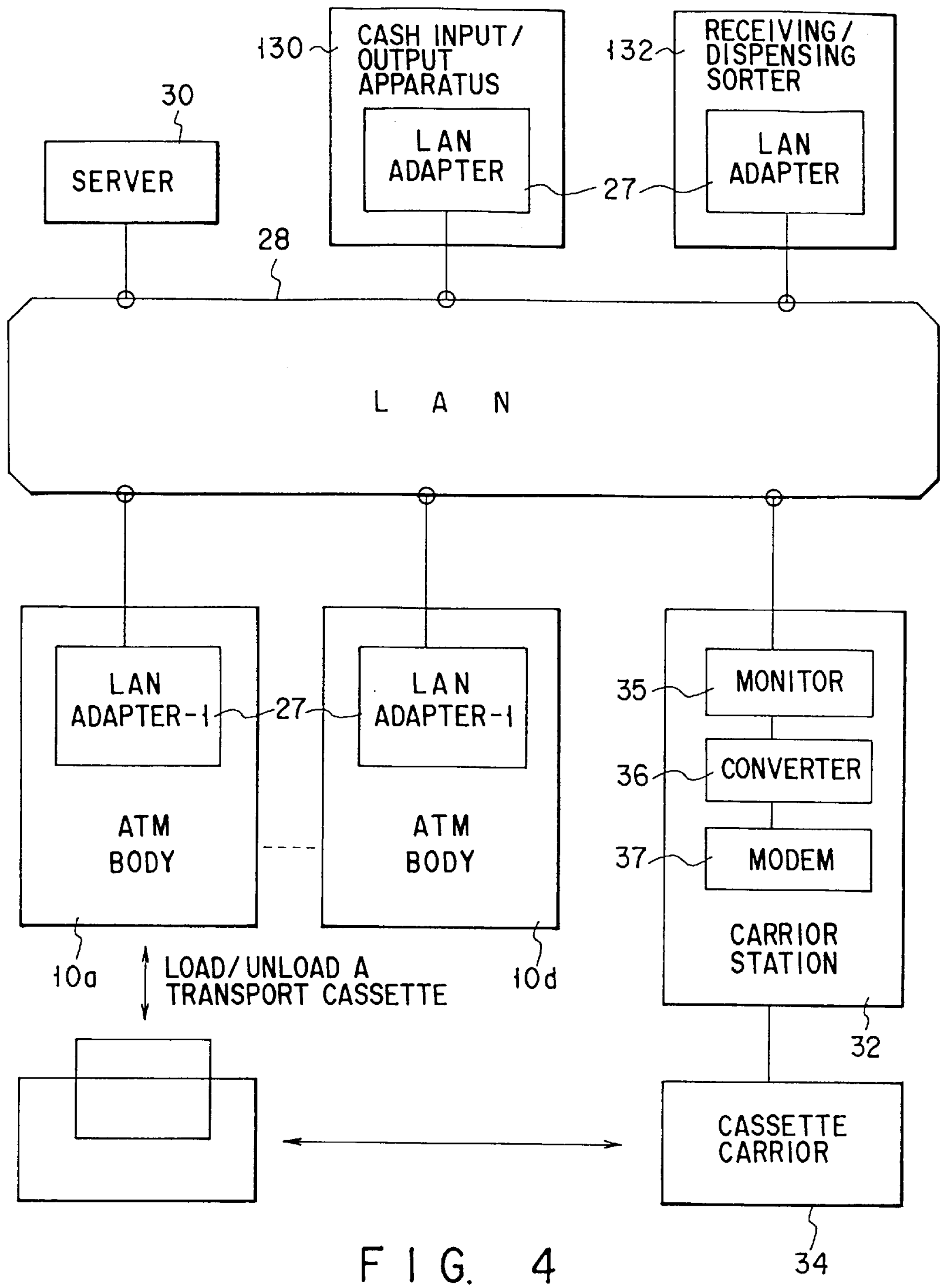

As shown in FIG. 4, the four ATMs 10*a* to 10*d*, front-side cash input/output apparatus 130 and cash receiving/dispensing sorter 132 are connected respectively through LAN adapters 27 to a local area network (LAN) 28. A server 30, such as a personal computer, is connected as an operation management terminal to the LAN 28 to monitor the ATMs 10*a* to 10*d*, the front-side cash input/output apparatus 130 and cash receiving/dispensing sorter 132. The operation states as sent as data from the respective ATMs 10*a* to 10*d*, front-side cash input/output apparatus 130 and cash receiving/dispensing sorter 132, such as any fault generation state and residual amount of bills and coin, as a medium to be handled, are reported through the LAN 28 to the server 30 at proper times.

As shown in FIGS. 2 and 4, the cash supplying/receiving device 12 has a carrier station 32 as transmitting means connected to the LAN 28 and a cassette carrier 34 serving as a self-traveling carrier which, in accordance with an instruction from the carrier station 32, can run on the floor surface 25 of the business place along the surface of an object of interest, such as up along the wall surface of the building, back surfaces of the ATMs 10*a* to 10*d*, back surface of the front-side cash input/output apparatus 130, the front surface of the cash receiving/dispensing sorter 132, side surface of desks, etc., located at the business support area in the financial institution.

The carrier station 32 is equipped with a monitor 35 comprised of a personal computer connected via the server 30 to the LAN 28. The monitor 35 transfers information and instruction to and from, and communicates with, the server 30. The instruction entering from the server 30 via the LAN 28 to the monitor 35 is converted to a radio (wireless) signal by a converter 36 and the radio signal is sent to a radio modem 37 and antenna 38 where it is transmitted to the cassette carrier 34. In accordance with the instruction from the carrier station 32, the cassette carrier 34 runs to a corresponding position of a predetermined cash transaction apparatus where the cash is transferred between the cassette carrier and the cash transaction apparatus.

As shown in FIGS. 2 and 5A to 5C, the cassette carrier 34 comprises a carrier 40 serving as a carrier body, a transport cassette 43 supported through a slide mechanism 42 on the carrier 40 and serving as a medium holding section or cash holding section, a substantially rectangular box-like housing 44 covering the transport cassette 43, etc.

As shown in FIGS. 5A to 7C, the carrier 40 has a rectangular plate-like base 45 with a pair of drive wheels, left and right, and one driven wheel 47 mounted thereon to allow the carrier 40 to run on the floor surface 25.

One drive wheel 46*a* is connected to a servo motor 50*a* through a worm speed reduction mechanism 48 and coupling 49 at the base 45, and the other wheel 46*b* to a servo motor 50*b* through a worm speed reduction mechanism 48 and coupling 49. The left and right drive wheels 46*a* and 46*b* are separately driven by two independent servo motors 50*a* and 50*b*. Through the normal/reverse rotations of the servo motors and their speed control, the carrier 40 travels back and forth on the floor surface 40 in a linear or curvilinear way.

In particular, the left and right drive wheels 46*a* and 46*b* are so arranged as to be rotatable about a common center axis C. The carrier 40 runs forward or backward in the linear way when the two drive wheels 46*a* and 46*b* are driven in the same direction, and rotates at a predetermined position about a point O on the center axis C in an intermediate position between the two drive wheels 46*a* and 46*b* when the two drive wheels are driven in the opposite directions.

The driven wheel 47 is of a so-called caster type and, in order to cope with the situations under which the carrier 40 runs in the curvilinear way or changes from the forward to the backward run, is so mounted on the base 45 that it is rotatable about a shaft 51. The shaft 51 and point O are so positioned as to align with a center axis L of the carrier 40 extending along a linear run direction of the carrier 40. It is to be noted that the drive wheels 46*a*, 46*b*, driven wheel 47, worm speed reduction mechanisms 48 and servo motors 50*a*, 50*b* constitutes drive means of the present embodiment.

Between the left and right drive wheels 46*a* and 46*b* a swingable arm member 52 is supported on the base 45. A frictional wheel 53 is mounted on the forward end side of the swingable arm member 52. The frictional wheel 53 is placed in contact with the floor surface 25 and rolls thereon in interlock with the running of the carrier 40. The rotation of the frictional wheel 53 is transmitted by a belt 54 to an encoder 55 on the base 40. The encoder 55 counts the transmitted rotation data as a predetermined number of pulses and is input to a controller as will be set out below.

A pair of rechargeable batteries 56 are mounted on the base 45 and serves as a drive source. As will be set out below, the batteries 56 drive the servo motors 50*a* and 50*b* and feed electric power to the other electric systems of the cassette carrier 34. Further, the batteries 56 are recharged by connecting a connector 57 (see FIG. 5) provided at the back surface of the housing 44, to a power feeding socket 58 (see FIG. 2) provided on the carrier station 32.

Figure 5A:
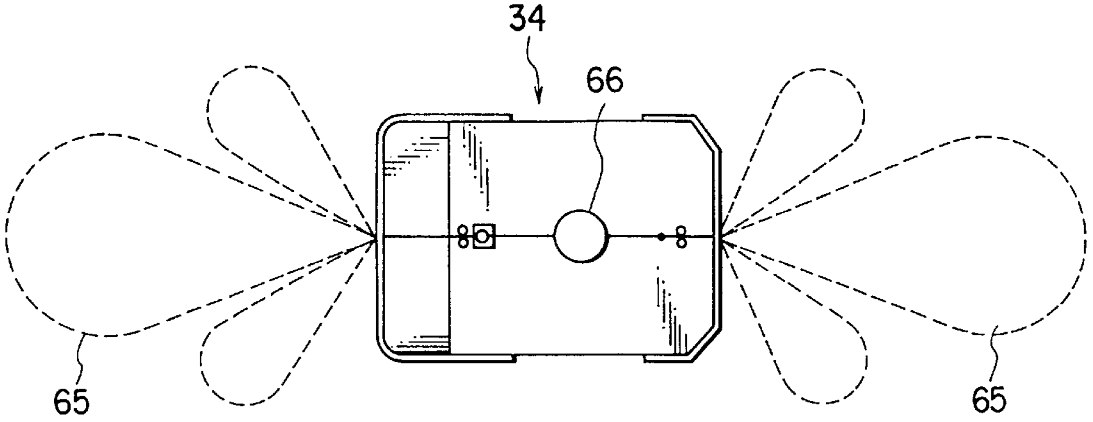
FIG. 5A is a plan view showing a cassette carrier of the cash transaction system.
Figure 5B:
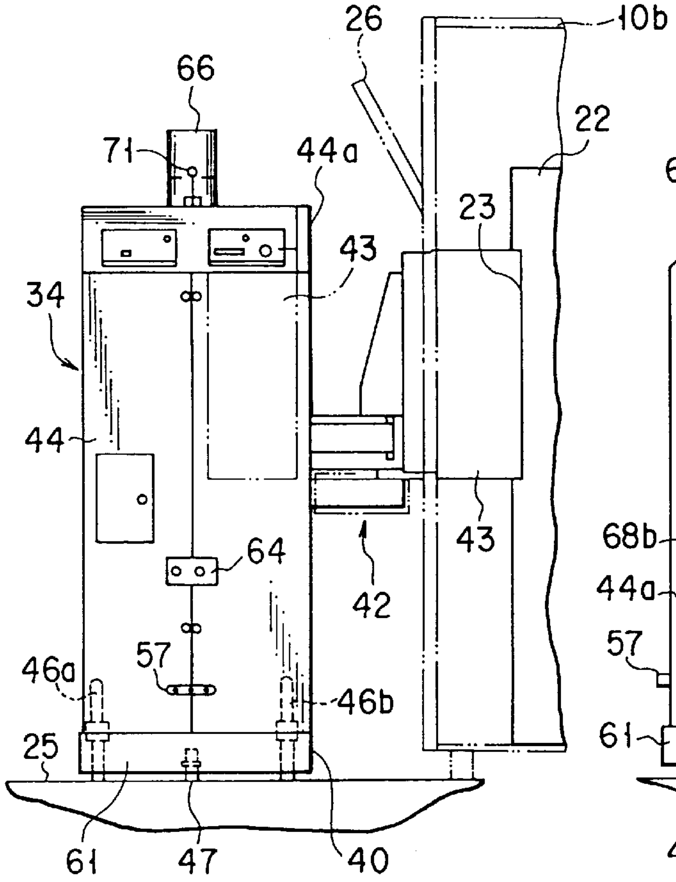
FIG. 5B is a side view showing the cassette carrier.
Figure 5C:
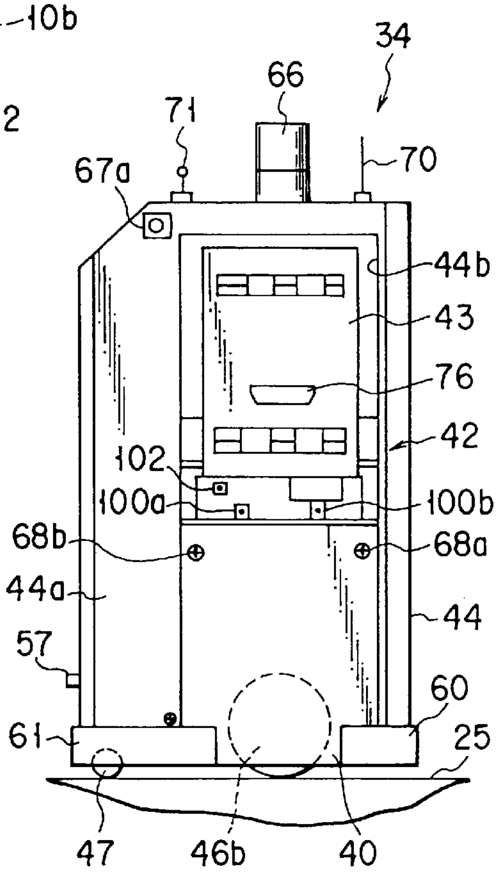
FIG. 5C is a front view showing the cassette carrier.
Figure 6:
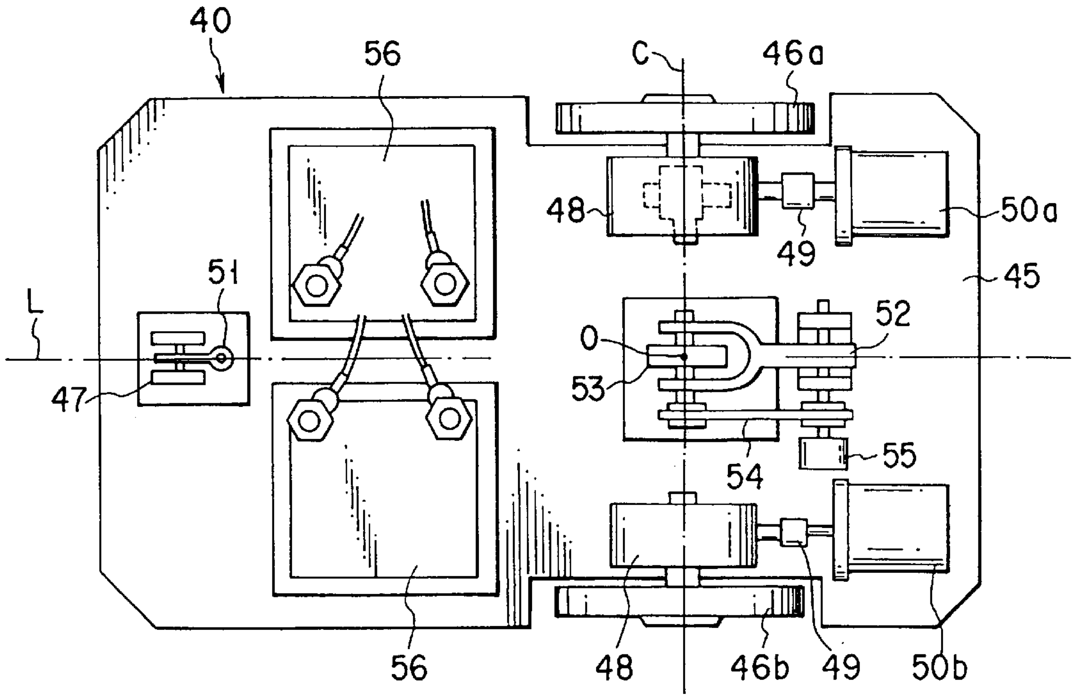
Figure 7:
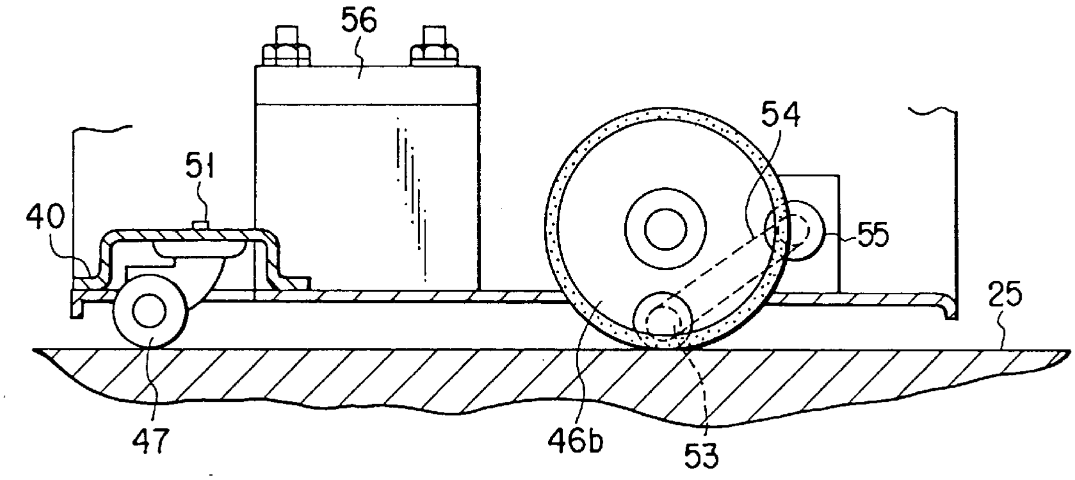

As shown in FIGS. 5A to 5C, bumpers 60, 61 are mounted one at the front and back sections of the carrier 40. Pressure sensors 62, 63 as will be set out below are mounted on the rear sides of the bumpers 60 and 61. When the bumpers 60, 61 encounter pressure upon being contacted with foreign matter and human body, the pressure sensors 62 and 63 respond, so that the servo motors 50*a* and 50*b* are stopped by the controller and hence the cassette carrier 34 stops running.

Further, a reflection type sensor 64 is provided at the front and back walls of the housing 44 and, when a reflecting object such as a human body emerges in its detection range 65, that is, in a carrier's front/back range of about 1 m, detects this situation so that the running of the cassette carrier 34 is stopped in the same way as set out above.

In addition to the safety devices, such as the pressure sensors 62, 63 and reflection type sensor 64, a patrol light 66 is mounted on the top surface of the housing 44 and lighted while being rotated during the running of the cassette carrier 34.

Further, the housing 44 has a side wall 44*a* which extends in the linear run direction of the carrier 40 and perpendicular to the floor surface 25. The side wall 44*a* of the housing 44 is adapted to face the back surface of the ATMs 10*a* to 10*b*, front surface of the front-side cash input/output apparatus 130 and the front surface of the cash receiving/dispensing sorter 132. A pair of reflection type distance sensors 68*a*, 68*b* are mounted on the side wall 44*a* of the housing 44 and spaced from each other in the linear run direction at a predetermined distance. The sensors 68*a* and 68*b* are used to position the cassette carrier 34 relative to a given cash transaction apparatus, such as the ATM. These reflection type distance sensors 68*a*, 68*b* are comprised of ultrasonic sensors and can accurately measure, in millimeter units, a distance from the side wall 44*a* of the housing 44 to a to-be-measured surface, that is, the back surface of the ATM in the direction perpendicular to the side wall 44*a*. The reflection type distance sensors 68*a*, 68*b* function as distance measuring sections and, together with a later-described distance measuring circuit 106, constitute measuring means.

A infrared light emitting element 67*a* of a remote-controller is provided at the upper portion of the side wall 44*a* of the housing 44. A light receiving section 67*a* for receiving the infrared light from the infrared light emitting element 67*a* is attached to each of the back surfaces of the ATMs 10*a* to 10*d*. Upon receipt of the inferred light by the light receiving section 67*b*, the door 26 of the ATM is opened so that the insertion opening 24 is opened.

An antenna 70 is mounted on the top surface of the housing 44 and connected to a later-described modem. The transmission and reception of a signal between the carrier station 32 and the cassette carrier 34 is effected via the antenna 70. An operation knob 71 is provided on the top surface of the housing 44, so that the operator can manually operate the cassette carrier 34.

As shown in FIGS. 5A to 5C and 8 to 10, a rectangular opening 44*b* is formed in the side wall 44*a* of the housing 44 and the transport cassette 43 is placed in the housing 44 in a state to oppose the rectangular opening 44*b*. The transport cassette 43 assumes a rectangular box-like shape of such a size as to allow it to pass through the rectangular opening 44*b*. The transport cassette 43 stores therein many piles of bills one upon another.

A delivery outlet 73*a* is provided in the lower portion of that side wall 43*a* of the transport cassette 43 which faces the cash transaction apparatus. Inside the delivery outlet 73*a* are arranged a plurality of supply rollers 74*a* for taking out bills 72 in the transport cassette 43 one by one and supplying to the facing cash handling apparatus for replenishment. Further, a bill take-in inlet 73*b* is formed in the upper portion of the side wall 43*a* of the transport cassette 43, and a plurality of take-in rollers 74*b* are provided inside the take-in inlet 73*b* to receive bills delivered out of the facing cash handling apparatus and withdraw them into the transport cassette 43.

Further, at the central area of the side wall 44*a* of the housing 44 is provided a connector 76 for controlling the operation of the transport cassette 43 from the cash handling apparatus side. That is, when the transport cassette 43 is fitted into the cassette loading section 23 of, for example, the ATM as will be set out below, the connector 76 is connected to the bill handling apparatus 22 in the ATM so that the operations of the supply rollers 74*a* and take-in rollers 74*b* of the transport cassette 43 can be controlled from the ATM side through the connector 76.

The transport cassette 43 is supported over the base 45 of the carrier 40 through a slide mechanism 42 for moving the transport cassette between the cassette carrier 34 and the cash transaction apparatus, a fine adjustment mechanism 78 serving as position adjustment means for finely adjusting the position of the transport cassette 43 relative to the insertion opening 24 and the cassette loading section 23 of the cash transaction apparatus, and a support frame 80.

Figure 8:
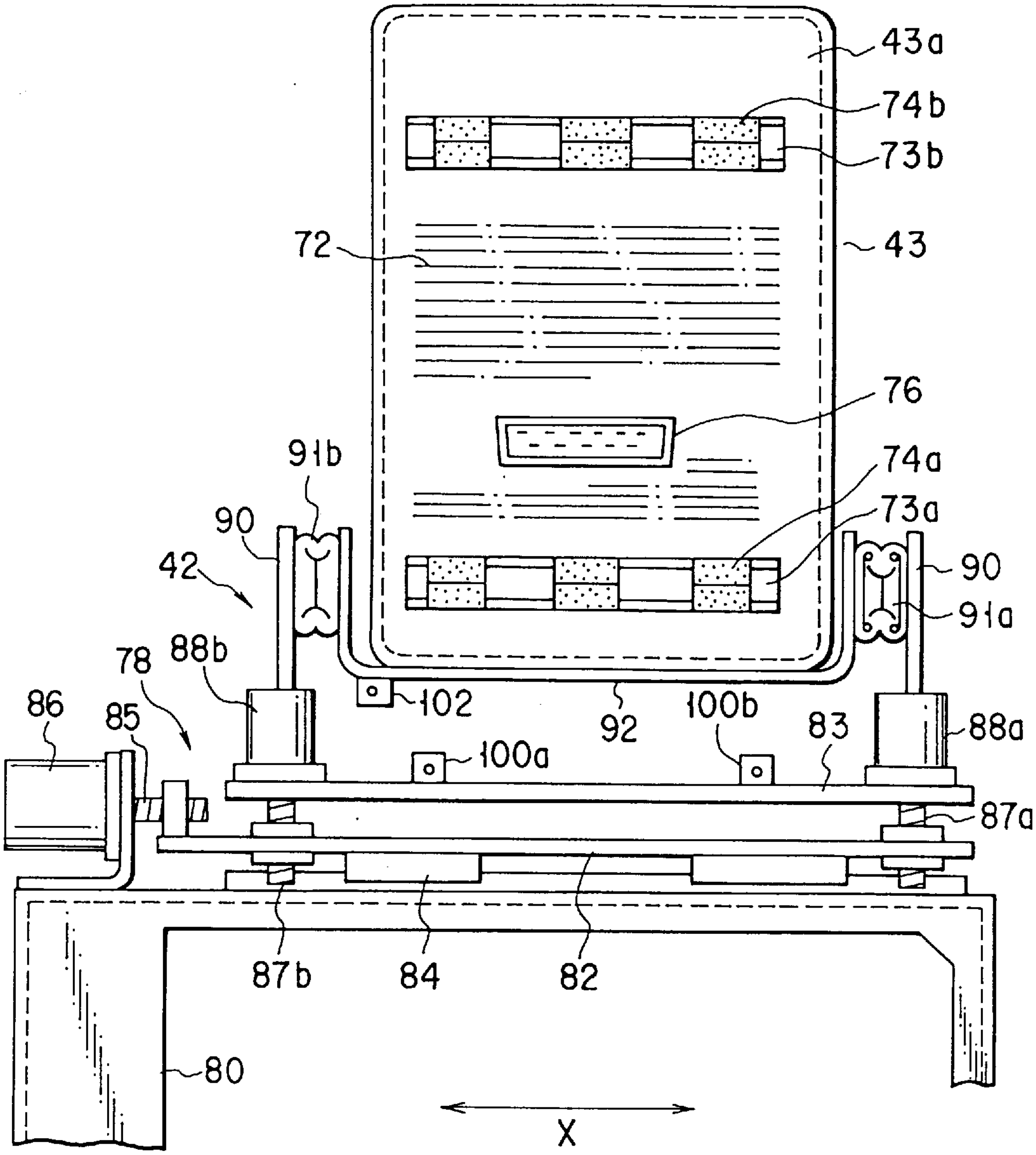
Figure 9:
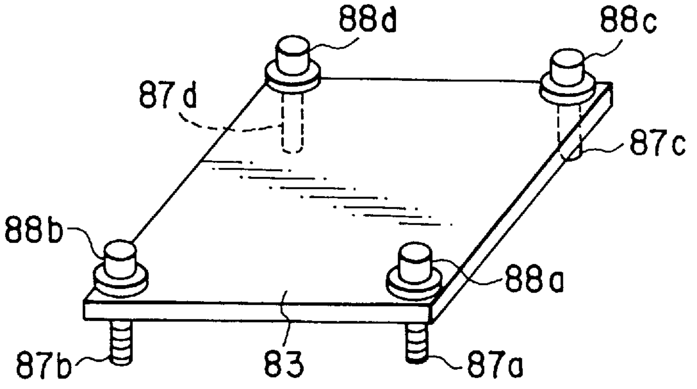

More specifically, as shown in FIGS. 8 and 9, the support frame 80 is mounted upright on the base 45 and the fine adjustment mechanism 78 has a lower table 82 and upper table 83 placed over the support frame 80. The lower table 82 is placed over the support frame 80 through linear sliders 84 and is reciprocally movable in an X-direction. The lower table 82 is reciprocally moved in the X-direction by a motor 86 through a ball screw 85 which are mounted on the support frame 80.

The upper table 83 overlying the lower table 82 has its four corners supported on the lower table by means of ball screws 87*a* to 87*d* extending in a Y-direction. These ball screws 87*a* through 87*d* are connected to four motors 88*a* through 88*d* mounted on the upper table 83. By driving the respective motors 88*a* through 88*d*, the four corners of the upper table 83 can be independently moved up and down, that is, in the Y-direction.

When the four motors 88*a* through 88*d* are rotated by the same amounts with the upper table set in a horizontal state, the upper table 83 is moved up and down while staying in the horizontal state. On the X Y Z coordinate system as shown in FIG. 2, the upper table 83 is tilted about the X axis in a Tz direction when the motors 88*a* and 88*b* are rotated simultaneously, and tilted about the Z axis in a Ty direction when the motors 88*a* and 88*c* are rotated simultaneously.

By controlling the motor 86 and four motors 88*a* through 88*d* the upper table 83 can be moved in a parallel way in an X- and a Y-direction and tilted in the Tz and the Ty direction.

The slide mechanism 42 has left and right slide rails 91*a* and 91*b* mounted on one pair of upstand support posts 90 on the upper table 83, and a base plate 92 supported by the slide rails 91*a*, 91*b*. The slide rails 91*a*, 91*b* extend in the Z-direction and hence the base plate 92 can be reciprocally moved in the Z-direction. The transport cassette 43 is placed on the base plate 92.

Figure 10:
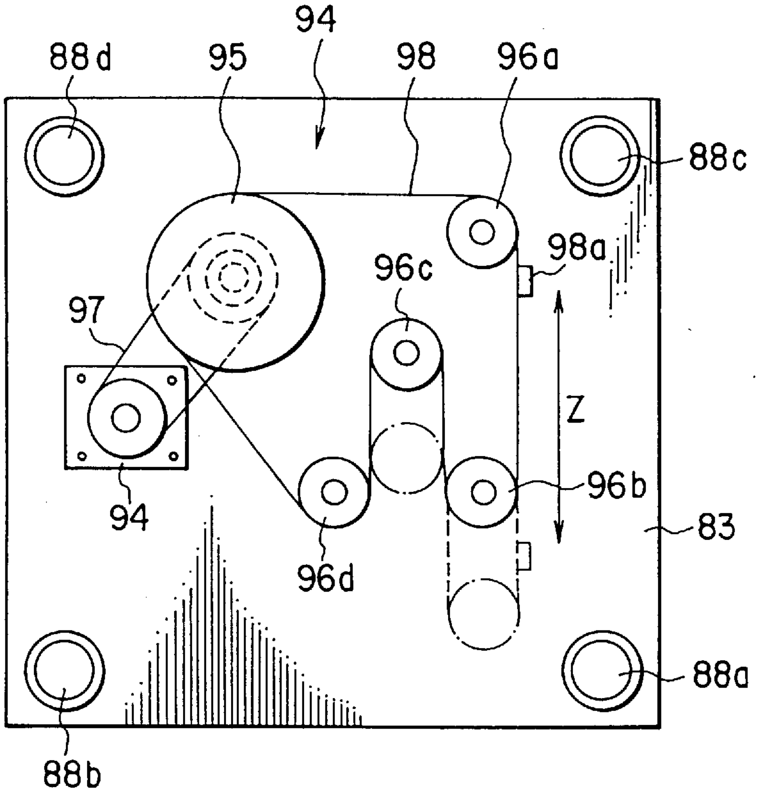

As shown in FIG. 10, a drive section 94 of the slide mechanism 42 includes a motor 94, a large pulley 95, and a plurality of small pulleys 96*a* to 96*d*. A drive belt 97 is entrained between the motor 94 and the large pulley 95 and a belt 98 between the large pulley and the small pulleys. A portion of the belt 98 is connected by a coupling portion 98*a* to the base plate 92. Of those small pulleys 96 through 96*d*, the small pulleys 96*b* and 96*c* are reciprocable over the upper table 83 in a Z-direction.

When the large pulley 95 is rotated by the motor 94 through the drive belt 97, the belt 98 is run and the base plate 92 is moved in the Z-direction through the coupling portion 98*a*. At this time, the small pulleys 96*b* and 96*c* are moved like running blocks and the coupling portion 98*a* and base plate 83 are reciprocable in the Z-direction while being at a greater stroke. By doing so, the transport cassette 43 on the base plate 92 is moved between a storage position wherein the cassette 43 is stored in the housing 44 as indicated by a two-dot and dash line in FIG. 5B, and a loading position of a solid line in FIG. 5B wherein the cassette projects outside from the housing 44 and can be loaded into the cassette loading section 23 of a given cash transaction apparatus.

The slide mechanism 42, together with the supply roller 74*a* and take-in rollers 74*b* of the transport cassette 43, provides supplying/receiving means of the present embodiment.

Further, in order to achieve the high-accuracy positioning of the transport cassette 43 relative to the cassette loading section 23 of the cash transaction apparatus, one pair of reflection type sensors 100*a*, 100*b* are mounted on the upper table 83 so as to face the cash transaction apparatus side and, further, one reflection type sensor 102 is mounted on the base plate 92 so as to face the cash transaction apparatus side.

Figure 11:
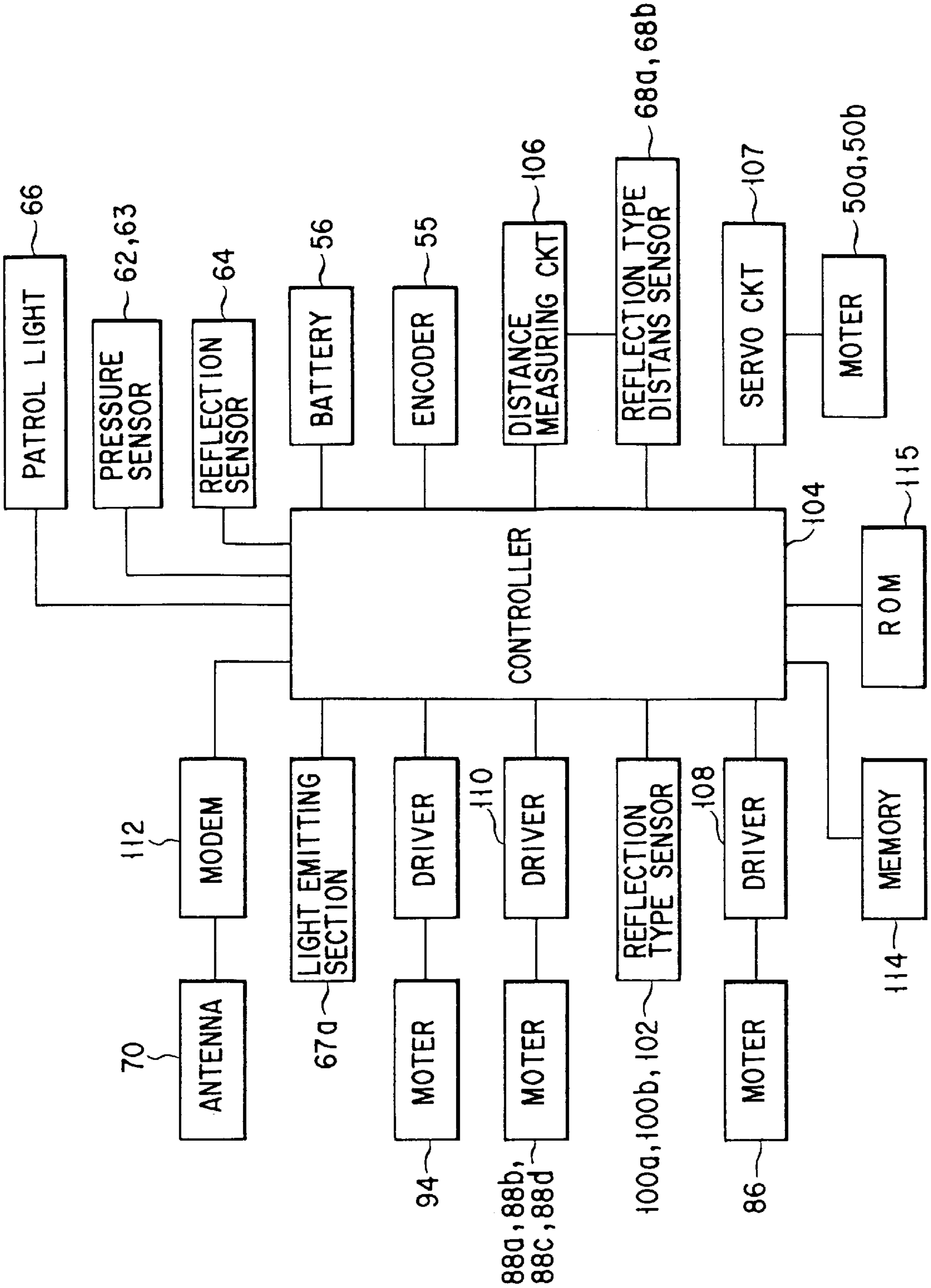

FIG. 11 is a schematic diagram showing an arrangement of a control system of the cassette carrier 34 thus structure. Stated in more detail, the cassette carrier 34 includes a controller section 104 serving as control means and including a microcomputer as a main element. The controller section 104 controls the operations of the above-mentioned various mechanisms in accordance with a control program stored in a ROM 105. To the control section 104 are connected a distance measuring circuit 106 for measuring the distance and inclination (parallelism) of the cassette carrier 34 relative to a measuring target surface on the basis of signals from the reflection type distance sensors 68*a*, 68*b*, a servo circuit 107 for controlling the rotations of the motors 50*a*, 50*b* for driving the drive wheels 46*a*, 46*b* in accordance with results of measurement by the distance measuring circuit 106, the encoder 55, the battery 56, the reflection type sensor 64, the pressure sensors 62, 63 and the patrol light 66.

Further, to the controller 104 are also connected those drivers 108 and 110 for driving the motor 86 and motors 88*a* to 88*d*, respectively, in the fine adjustment mechanism 78, reflection type sensors 100*a*, 100*b* and 102, a modem 112 for sending a radio signal to the antenna 70, the remotely-controlling infrared light emitting element 67*a*, and a memory 114 for storing the stop positions, etc., of the cassette carrier 34.

The operation of the cash transaction system thus arranged will be explained.

First, the cash transaction system is installed in the financial institution, etc., and the cassette carrier 34 receives practical teachings before it is put in actual operation. More specifically, the cassette carrier 34 is initially given the teachings as to how far it has to run from the carrier station 32 to the positions facing any of the respective ATMs 10*a* through 10*d*, front-side cash input/output apparatus 130 and cash receiving/dispensing sorter 132.

Figure 12:
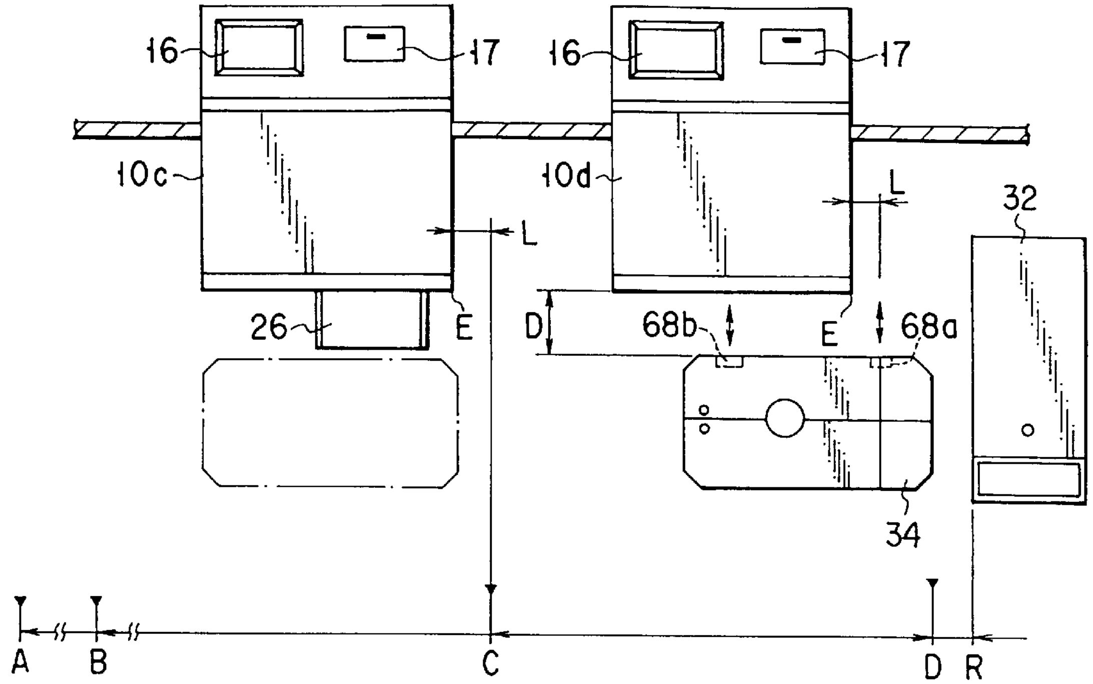

Now explanation will be given, by way of typical example, as to how to teach the cassette carrier 34 stop positions relative to the respective ATMs. As shown in FIG. 12, let a reference position R to be a rear surface position of the cassette carrier 34 taken when it is docked to the carrier station 32, and let a stop position D of the cassette carrier 34 relative to the ATM 10*d* to be a rear surface position of the cassette carrier taken when the X-direction distance L between the reflection type distance sensor 68*a* of the cassette carrier 34 and that side surface of the ATM 10*d* situated on the carrier station 32 side is about 3 cm. Similarly, let stop positions C, B and A of the cassette carrier 34 relative to the ATMs 10*c*, 10*b* and 10*a*, respectively, to be rear surface positions of the cassette carrier 34 taken when the X-direction distance L of the reflection type distance sensor 68*a* relative to the ATMs 10*c*, 10*b* and 10*a* is about 3 cm. Then, the cassette carrier 34 is forced to run from the reference position R to the respective stop positions D, C, B and A and, at this time, the encoder 55 counts the corresponding rotation pulse number and the number of the pulses corresponding to the distances RD, DC, CB and BA are stored in the memory 114.

After such teachings are completed, the cassette carrier 34 is forced to start running in actual practice. In a normal operation, the server 30 monitors the operation states of the respective ATMs 10*a* to 10*d* and operation states of the front-side cash input/output apparatus 130 and cash receiving/dispersing sorter 132 and receives the operation data of the cash transaction apparatus, as a report at any proper time, such as a trouble occurrence situation, a residual amount of bill and coins as a medium to be handled, and so on, via the LAN 28.

Based on these information items, the server 30 recognizes a smaller residual amount of bills in any given cash handling apparatus and a greater residual amount of bills in any another cash handling apparatus and, while considering any predictive information of which cash handling apparatus is more often utilized in the near future, finally determines from which cash handling apparatus bills should be withdrawn and to which cash handling apparatus bills should be supplied for replenishment. In the case where, for example, bills are withdrawn from the ATM 10*d* and supplied to the ATM 10*c* for replenishment, the server 30 issues an instruction to that effect.

This instruction is input via the LAN 28 to the carrier station 32 and ATMs 10*d* and 10*c*. For the transfer of the bills, the ATMs 10*d* and 10*c* are placed in a "wait" state until the cassette carrier 34 arrives. It is to be noted that, even in the "wait" state, the respective ATM 10*d* and 10*c* can transact with the client for cash.

The instruction input to the carrier station 32 is transmitted from the antenna 38 after being passed through the monitor 35, converter 36 and modem 37 and it is received via the antenna 70 of the cassette carrier 34 and the modem 112 to the controller section 104.

Responsive to this instruction, the controller 104 operates the motors 50*a* and 50*b* to rotate the drive wheels 46*a*, 46*b* in the normal direction, so that the cassette carrier 34 runs toward the ATM 10*d*. With the run of the cassette carrier 34, the frictional wheel 53 is rotated and the encoder 55 generates rotation pulses. The controller 104 stops the driving of the motors 50*a*, 50*b* when the number of pulses counted by the encoder 55 reaches a predetermined pulse number set upon the teaching, that is, the pulse number corresponding to the RD. Thus, the cassette carrier 34 stops at the stop position D corresponding to the ATM 10*d*.

It is to be noted that, depending upon the state of the floor surface 25, there are sometimes the cases where the cassette carrier 34 does not stop accurately at a stop position C due to the slipping of the drive wheels 46*a*, 46*b* or frictional wheel 53. However, it does not matter if the distance L is about 3 cm.

While confirming that the distance D between the cassette carrier 34 and the rear surface of the ATM 10*d* is a predetermined value based on the detection signal from the reflection type distance sensor 68*d*, the controller 104 operates the cassette carrier 34 to further run from the stop position D until the side edge E of the ATM 10*d* situated on the carrier station 32 side is detected by the reflection type distance sensor 68*a*. The controller 104 operates the carrier 34 to further run from the detected position of the side edge E by a given distance corresponding to a previously stored program in the ROM 105, that is, by an extent corresponding to a given number of pulses and to stop. By doing so, the cassette carrier 34 stops at a predetermined stop position where it is possible to supply and receive bills to and from the ATM 10*d*.

Figure 13:
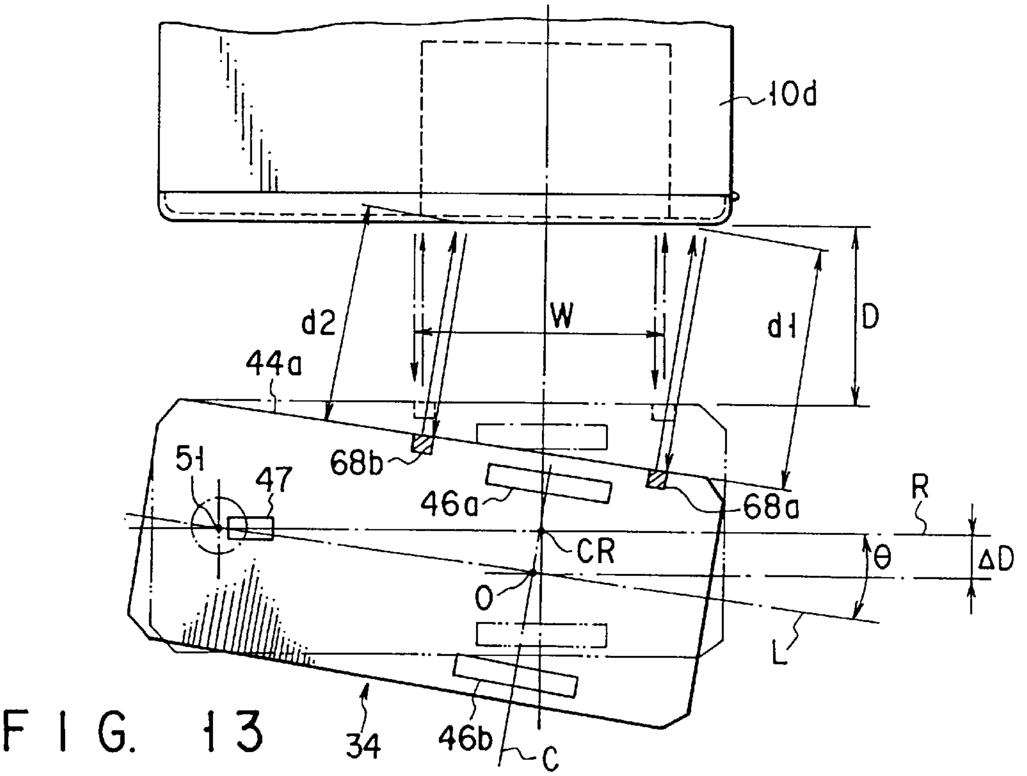

As shown in FIG. 13, when the cassette carrier 34 stops at the predetermined stop position, the controller 104 measures, on the basis of the detection signals from the reflection type distance sensors 68*a* and 68*b*, a distance d1 from the distance sensor 68*a* to the rear surface of the ATM 10*d* and a distance d2 from the distance sensor 68*b* to the rear surface of the ATM 10*d*, and measures whether or not the distances d1 and d2 coincide with those previously set predetermined distances and the inclinations of the cassette carrier 34 relative to the rear surface of the ATM10*d*, that is, the parallelisms. When at least one of the distances d1 and d2 is different from the predetermined value or the cassette carrier 34 is inclined relative to the rear surface of the ATM, that is, the cassette carrier 34 is displaced from the predetermined stop position, the controller 104 corrects the displacement by a later-described step to position the cassette carrier 34 at the predetermined stop position.

By the above-mentioned operation, the cassette carrier 34 runs to, and is positioned at, a position where its opening 44*b* substantially confronts the insertion opening 24 of the ATM 10*d*. In this state, an "open" signal for opening the door 26 is delivered as an output signal and the corresponding ATM 10*d* receives the "open" signal at its light receiving section 67*b* to open the door 26 and hence open the insertion opening 24.

Then, the controller 104 measures a positional displacement between the lower and upper tables 82 and 83 and the insertion opening 24 of the ATM10*d* by the detection signals of the reflection type sensors 100*a*, 100*b* and 102 and, if there is any positional displacement, allows the lower table 82 to move in the X-direction, or allows the upper table 83 to move in the Y-direction or tilt Tz or Ty direction through the fine adjustment mechanism 78 so that the positional displacement is accurately corrected. As a result, the transport cassette 43 on the upper table 83 is accurately located relative to the insertion opening 24 and cassette loading section 23 of the bill handling apparatus 22 in the ATM 10*d*.

After the above-mentioned fine adjustment has been completed, the controller 104 actuates the slide mechanism 42 so as to move the transport cassette 43 from the storage position in the housing 44 to the loading position. By doing so, the transport cassette 43 passes through the insertion opening 24 of the ATM 10*d* and is loaded into the cassette loading section 23 of the bill handling apparatus 22. At this time, the connector 76 on the transport cassette 43 is connected to the bill handling apparatus 22.

After the loading operation is ended, an "end" signal is transmitted from the controller 104 to the carrier station 32 via the modem 112 and antenna 70, and further to the server 30 via the LAN 28. Upon receipt of the signal the server 30 communicates the end of loading of the transport cassette 43 to the ATM 10*d* and inputs to the bill handling apparatus 22 of the ATM 10*d* an instruction to the effect that, for example, 400 bills be withdrawn.

According to the signal, the bill handling apparatus 22 delivers bills held therein and drives the take-in rollers 74*b* in the transport cassette 43 so as to withdraw a corresponding number of bills, as instructed, into the transport cassette 43. It is to be noted that, if the ATM 10*d* is at that time in service, the withdrawing operation is started after the transaction service has been ended.

After the completion of the withdrawing operation, an "end" report is sent from the ATM 10*d* to the server 30 and, in receipt of this report, the server 30 sends an "end" signal via the LAN 28 and carrier station 32 to the cassette carrier 34. In accordance therewith, the controller 104 of the cassette carrier 34 operates the slide mechanism 42 to move the transport cassette 43 from the loading position to the storage position so that it is stored in the housing 44.

Subsequently, in the same manner as mentioned above, the controller 104 operates the cassette carrier 34 to run to a predetermined stop position C relative to the ATM 10*c* and, through the fine adjustment, moves the transport cassette 43 into the cassette loading section 23 of the bill handling apparatus 22 in the ATM 10*c*. Thereafter, the transport cassette 43 delivers its stored bills in predetermined numbers to the bill handling apparatus in the ATM 10*c*, and then is returned back to the reference position R.

An explanation will now be given about a correction operation at a time when the cassette carrier 34 stops at a position off a predetermined stop position. For example, it is assumed that, in a running process of the cassette carrier 34 from the carrier station 32 to the predetermined stop position relative to the ATM 10*d*, the sense of the driven wheel 47 varies due to a variation in frictional coefficient at the floor surface 25 and, as shown in FIG. 13, the cassette carrier 34 oscillates at its forward end portion.

In FIG. 13, a position as indicated by a two-dots and dash line shows a predetermined stop position relative to the ATM 10*d*. When the cassette carrier 34 stops accurately to this predetermined position, a center axis L of the cassette carrier 34 is located coaxial with a predetermined reference axis R and a rotational center O of the cassette carrier 34 aligns with a reference rotational center CR on the reference axis R, so that the side wall 44*a* of the cassette 34 faces the rear surface of the ATM 10*d*, in a parallel way, with a predetermined distance D.

In the case where the cassette carrier 34 stops at a position off the predetermined stop position as indicated by the solid line in FIG. 13, the controller 104 measures an amount of displacement as described later and executes a correction operation.

Figure 14:
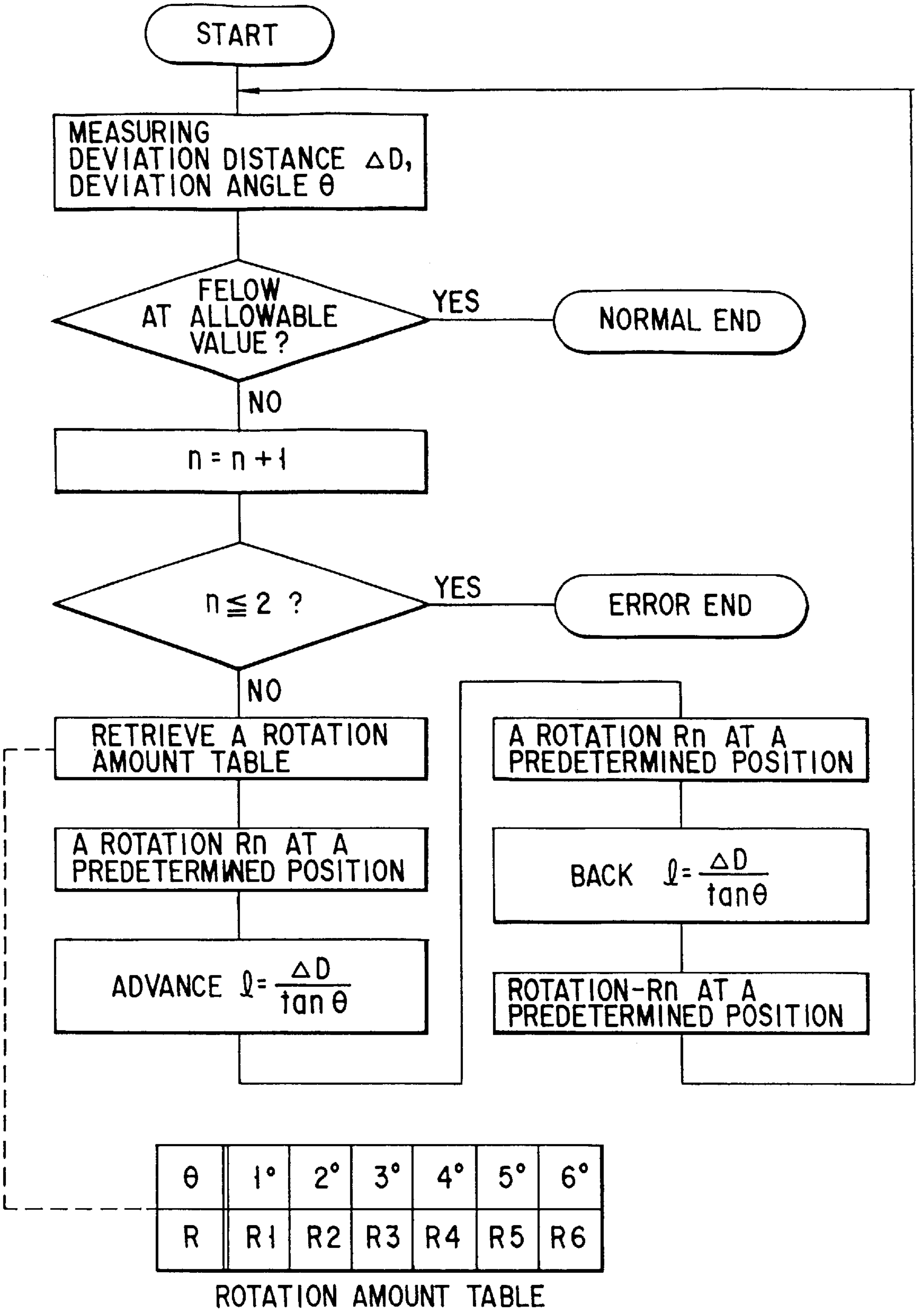

As shown in FIGS. 13 and 14, first, the controller 104 measures, based on the detection signals from the reflection type distance sensors 68*a* and 68*b*, a distance d1 between the distance sensor 68*a* and the rear surface of the ATM 10*d* and a distance d2 between the distance sensor 68*b* and the rear surface of the ATM 10*d* in a direction perpendicular to the side wall 44*a* of the cassette carrier 34 and, in the cases where these distances d1 and d2 are mutually different and do not coincide with the previously set predetermined distances, measures that displacement angle $\theta$ and displacement distance $\Delta D$.

When W representing a distance between the reflection type distance sensors 68*a* and 68*b* in a linear run direction of the cassette carrier 34, if the displacement angle $\theta$ is near to zero degree, it is possible to calculate the displacement angle: $d1-d2=W \tan \theta$; and the displacement distance: $\Delta D=(d1+d2)/2-D$ As shown in FIGS. 14 through 15F, the controller 104 determines whether or not the measured displacement angle and displacement distance are in a range of allowable values and, when they are in the range of the allowable values, executes no correction operation and enables a shift to the next operation. In the case where they are out of the range of the allowable values, the controller 104 increments the number of corrections, n, by one count and retrieves a rotation amount table in the control program stored in the ROM 105. The rotation amount table is such that a specific correction value R is given to a corresponding one-degree interval value obtained by rounding off the measured displacement angle $\theta$. The controller 104 finds the correction value R corresponding to the measured displacement angle $\theta$ and rotates the cassette carrier 34 based the correction value R.

Figure 15A:
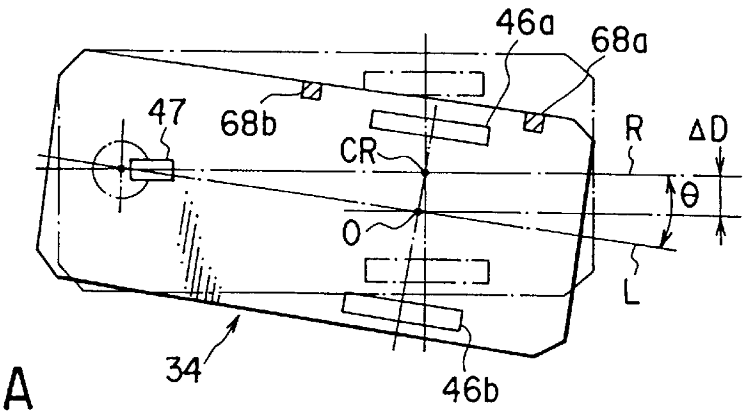
Figure 15B:
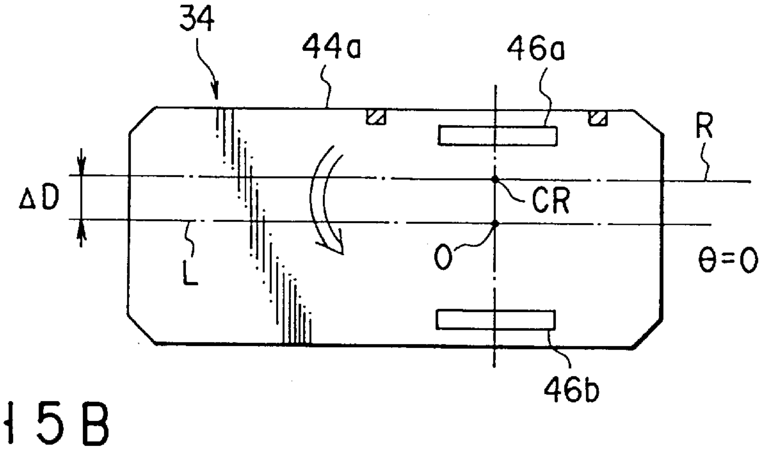

Stated in more detail, as shown in FIG. 15B, the controller 104 allows normal and reverse rotations of the drive wheels 46*a* and 46*b*, respectively, by an amount corresponding to the correction value R. By doing so, the cassette carrier 34 rotates counter-clockwise about the rotational center O through the angle $\theta$ so that the side wall 44*a* of the cassette carrier 34 becomes parallel to the rear surface of the ATM 10*d*.

Figure 15C:
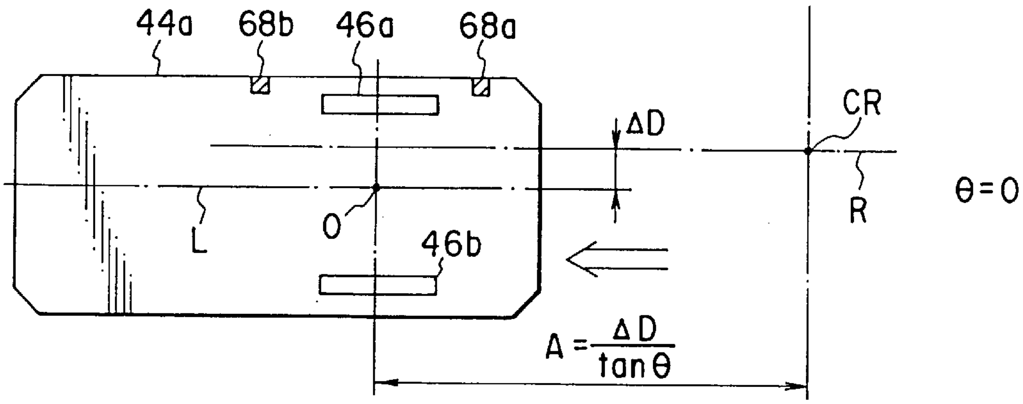
Figure 15D:
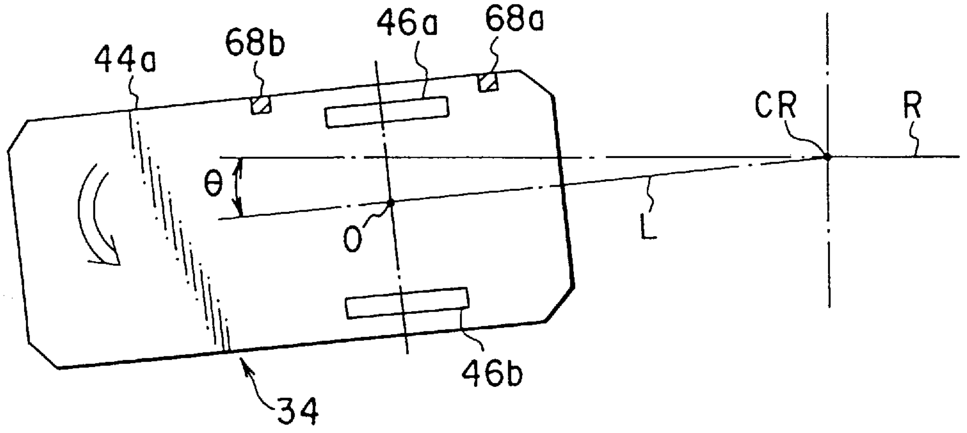
Figure 15E:
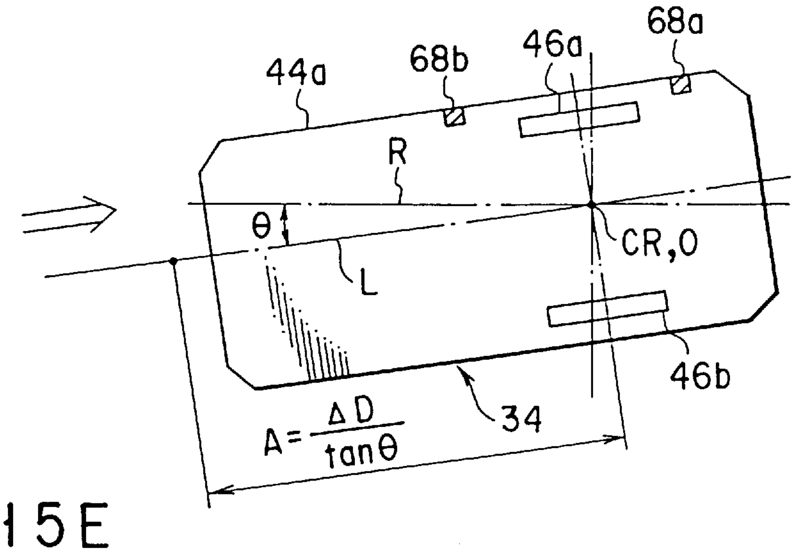
Figure 15F:
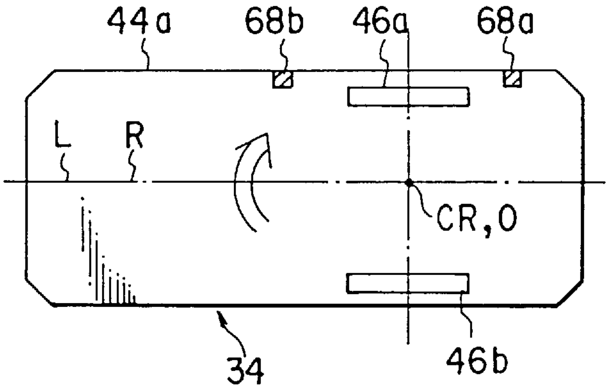

Then as shown in FIG. 15C, the controller 104 rotates the drive wheels 46*a* and 46*b* in the normal rotation direction so that the cassette carrier 34 runs forward by a correction distance $A=\Delta D/\tan \theta$. Thereafter, as shown in FIG. 15D, the controller 104 drives the drive wheels 46*a* and 46*b* in the normal and reverse rotation directions, respectively, by an amount corresponding to above-mentioned correction value R so that the cassette carrier 34 rotates about the rotational center O counterclockwise through the angle $\theta$.

Then the controller 104, as shown in FIG. 5E, drives the drive wheels 46*a* and 46*b* in the reverse rotation direction, so that the cassette carrier 34 runs backward by a distance corresponding to the abovementioned correction distance A. Thus, the rotational center O of the cassette carrier 34 coincides with the reference rotational center CR. As shown in FIG. 15F, the controller 104 allows the drive wheels 46*a* and 46*b* to be reverse-and normal- rotated, respectively, by the amount corresponding to the correction value R, so that the cassette carrier 34 rotates about the rotational center O in a minus direction, that is, rotates clockwise through the angle θ.

Accordingly, the cassette carrier 34 is positioned in a proper predetermined stop position where its side surface 44*a* confronts the rear surface of the ATM 10*d* in parallel thereto with the predetermined distance D. Thus the correction operation is completed. In the case where the cassette carrier 34 does not run back to the predetermined stop position by one correction operation, the above-mentioned correction operation is again performed and, if this operation cannot be done successfully, then the correction operation is ended as an error.

Although the transfer of the cash between the cassette carrier 34 and the ATM and correction operation have been explained above, similar transfer of cash and correction operation are performed between the cassette carrier on one hand and another cash handling apparatus, on the other, such as the cash receiving/dispensing sorter 132.

According to the cash transaction system thus constructed, the automatic transfer of the cash can be made, by the cash supplying/receiving device 12, between a plurality of cash handling apparatuses and it is, therefore, possible to achieve a greater saving in the time and labor of the operator. And the cassette carrier 34 of the cash supplying/receiving device 12 can run relative to any given cash handling apparatus, over a wireless channel, in a trackless fashion without any guide rails, traveling tapes, etc. For this reason, it is not necessary to install any guide rails, traveling tapes, etc. so that the cash transaction system can be installed relatively easily at low costs and made compact as a whole.

Further, since the cash supplying/receiving device 12 is equipped with the positioning mechanism for positioning the cassette carrier 34 relative to the cash handling apparatus and the fine adjustment mechanism for finely adjusting the positions of the transport cassette 43 to the insertion opening 24 and cassette loading section 23 of the cash handling apparatus, it is possible to, even if the installation surface of the cash transaction system, that is, the floor surface of the financial institution, etc., is somewhat inclined, positively load the transport cassette 34 into the cash handling apparatus so that the cash can be positively supplied and received. Thus it is possible to, even if the installation site is a normal floor surface, install the cash transaction system without any special installation work and to achieve a further saving in the installation cost and, in addition, relatively freely select the installation site for the cash transaction system.

Further, according to the above-mentioned cash supplying/receiving device, the paired reflection type distance sensors 68*a*, 68*b* on the cassette carrier 34 allow the cassette carrier 34 to be positioned relative to the cash handling apparatus in the X-direction, that is, in the run direction, and detect the inclination, parallelism and distance of the cassette carrier relative to the target surface of the cash handling apparatus. It is, therefore, possible to measure the displacement angle and distance of the cassette carrier 34 relative to a given stop position on the basis of the detected inclination, parallelism and distance and to accurately position the cassette carrier relative to the cash handling apparatus through the correction of the displacement in accordance with results of measurement.

The present invention is not limited to the above-mentioned embodiment and various changes or modifications can be made without departing from the spirit and scope of the present invention. Although, in the above-mentioned embodiment, the paired reflection type distance sensors are arranged symmetrically relative to the center axis of the drive wheels, if they are arranged in a spaced-apart relation in the run direction of the cassette carrier, it is possible to make the same measurement as set out above.

Further, although the ATMs are arranged in a linear array and the cassette carrier 34 is of such a type that is can reciprocally run in a linear way, it may be possible to, as required, arrange a plurality of ATMs in a curvilinear or bent array. Even in this case, the cassette carrier 34 can freely run along such an array of the ATMS.

The cash transaction system may be so structured as to include, as a cash handling apparatus, other apparatuses such as a cash counting apparatus. Further, the medium to be handled may include not only the bills but also coins, passbooks, cards, journal sheets, etc., or a plurality of kinds of such media can be handled at a time.

Although, in the above-mentioned embodiment, the cash is withdrawn by the cash supplying/receiving device from any given one of the ATMs and the withdrawn cash is supplied to other cash handling apparatuses, the present invention is not restricted thereto. It may be possible to, by the cash supplying/receiving device, withdraw cash from the cash handling apparatus or supply cash to the cash handling apparatus for replenishment.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A device for supplying and receiving a medium to be handled to and from a plurality of apparatuses arranged on an installation surface and each having an insertion opening for the medium, the device comprising:

(A) means for transmitting, over a wireless channel, an instruction signal for designating any apparatus to and from which the medium is supplied and received; and (B) a movable carrier for supplying and receiving the medium to and from the designated apparatus in accordance with the instruction signal, the movable carrier including:

(a) a carrier body for running on the installation surface along any path, without assistance of guides on the path, the carrier body having a pair of independently rotatable drive wheels, and driving means for rotating the drive wheels in the same direction to run the movable carrier in a linear way and for rotating the drive wheels in directions opposite to each other to rotate the movable carrier at a given position, (b) measuring means having a pair of distance measuring sensors arranged with a distance therebetween in a running direction of the carrier body and in a plane substantially perpendicular to the installation surface, for measuring distances between a measuring target surface and the respective distance measuring sections, (c) a medium holding section provided on the carrier body, for holding the medium therein, (d) supplying/receiving means provided on the carrier body, for transferring the medium between the medium holding section and the designated apparatus through the insertion opening, and (e) control means for operating the driving means to run the movable carrier to a position facing the designated apparatus, for calculating the position and inclination of the movable carrier relative to the designated apparatus based on the distances measured by the measuring means, for detecting an amount of displacement of the movable carrier relative to a predetermined stop position in accordance with the calculated position and inclination, for correcting the displacement by linearly running and rotating the movable carrier by the driving means on the basis of the amount of displacement so as to position the movable carrier at the predetermined stop position, and for operating the supplying/receiving means, in accordance with the instruction signal, wherein the movable carrier has detecting means for detecting a position of the medium holding section relative to the insertion opening of the designated apparatus, and position adjusting means provided on the carrier body, for adjusting the position of the medium holding section relative to the insertion opening of the designated apparatus, and wherein the control means includes means for operating the position adjusting means in accordance with the result of detection by the detecting means.

2. A device for supplying and receiving a medium to be handled to and from a plurality of apparatuses installed on an installation surface for handling the medium, the device comprising:

a movable carrier for running on the installation surface along any path, without assistance of guides on the path, the movable carrier including:

(a) a carrier body having a pair of independently rotatable drive wheels, (b) driving means provided on the carrier body, for rotating the drive wheels in the same direction to run the movable carrier in a linear way and for rotating the drive wheels in directions opposite to each other to rotate the movable carrier at a given position;

(c) measuring means having a pair of distance measuring sections which are arranged with a distance therebetween in a running direction of the carrier body and in a plane substantially perpendicular to the installation surface, for measuring distances between a measuring target surface and the respective distance measuring sections, (d) control means for operating the driving means to run the movable carrier to a position facing a given apparatus, for calculating the position and inclination of the movable carrier relative to the given apparatus based on the distances measured by the measuring means, for detecting an amount of displacement of the movable carrier relative to a predetermined stop position in accordance with the calculated position and inclination, for correcting the displacement by linearly running and rotating the movable carrier by the driving means on the basis of the amount of displacement so as to position the movable carrier at the predetermined stop position, and (e) supplying/receiving means provided on the carrier body, for transferring the medium between the movable carrier which is positioned at the predetermined stop position and the given apparatus, wherein the movable carrier has a medium holding section provided on the carrier body, for holding the medium therein, detecting means for detecting a position of the medium holding section relative to the insertion opening of the given apparatus, and position adjusting means provided on the carrier body, for adjusting the position of the medium holding section relative to the insertion opening of the given apparatus, and the control means includes means for operating the position adjusting means in accordance with the result of detection by the detecting means.

3. A device according to claim 2, wherein the carrier body has a pivotal driven wheel.

4. A device according to claim 2, wherein the paired drive wheels are rotatable about a common center axis and the movable carrier is rotatable about a rotational center between the paired drive wheels on the common center axis.

5. A device according to claim 4, wherein the distance measuring sections are arranged symmetrically over the center axis of the drive wheels.

6. A device according to claim 2, further comprising means for transmitting, over a wireless channel, an instruction signal for designating a desired apparatus to and from which the medium is supplied and received, and wherein the control means has means for operating the drive means in accordance with the instruction signal to run the movable carrier to a position facing the designated apparatus.

7. A device for supplying and receiving cash to and from a plurality of automatic teller machines (ATMs) arranged on an installation surface and each having a cash storage section for storing cash therein and an insertion opening through which the cash is received and discharged, the device comprising:

(A) means for transmitting, over a wireless channel, an instruction signal for designating an ATM to and from which the cash is supplied and received; and (B) a movable carrier for supplying and receiving cash to and from the designated ATM in accordance with the instruction, the movable carrier including:

(a) a carrier body for running on the installation surface along any path, without assistance of guides on the path, the carrier body having a pair of independently rotatable drive wheels, and driving means for rotating the drive wheels in the same direction to run the movable carrier in a linear way and for rotating the drive wheels in directions opposite to each other to rotate the movable carrier at a given position, (b) measuring means having a pair of distance measuring sensors arranged with a distance therebetween in a running direction of the carrier body and in a plane substantially perpendicular to the installation surface, for measuring distances between a measuring target surface and the respective distance measuring sections, (c) a cash holding section provided on the carrier body, for holding the cash therein, (d) supplying/receiving means provided on the carrier body, for transferring the cash between the cash holding section and the designated ATM through the insertion opening, and (e) control means for operating the driving means to run the movable carrier to a position facing the designated ATM, for calculating the position and inclination of the movable carrier relative to the designated ATM based on the distances measured by the measuring means, for detecting an amount of displacement of the movable carrier relative to a predetermined stop position in accordance with the calculated position and inclination, for correcting the displacement by linearly running and rotating the movable carrier by the driving means on the basis of the amount of displacement so as to position the movable carrier at the predetermined stop position, and for operating the supplying/receiving means in accordance with the instruction signal, wherein the movable carrier has detecting means for detecting a position of the cash holding section relative to the insertion opening of the designated ATM, and position adjusting means provided on the carrier body, for adjusting the position of the cash holding section relative to the insertion opening of the designated ATM, and wherein the control means includes means for operating the position adjusting means in accordance with the result of detection by the detecting means.

8. A device for supplying cash to and for receiving cash from a plurality of automatic teller machines (ATMs) arranged on an installation surface and each having a cash storage section for storing cash therein and an insertion opening through which the cash is received and discharged, the device comprising:

a movable carrier for running on the installation surface along any path, without assistance of guides on the path, the movable carrier including:

(a) a carrier body having a pair of independently rotatable drive wheels, (b) driving means provided on the carrier body, for rotating the drive wheels in the same direction to run the movable carrier in a linear way and for rotating the drive wheels in directions opposite to each other to rotate the movable carrier at a given position, (c) measuring means having a pair of distance measuring sections which are arranged with a distance therebetween in a running direction of the carrier body and in a plane substantially perpendicular to the installation surface, for measuring distances between a measuring target surface and the respective distance measuring sections, (d) control means for operating the driving means to run the movable carrier to a position facing a desired ATM, for calculating the position and inclination of the movable carrier relative to the desired ATM based on the distances measured by the measuring means, for detecting an amount of displacement of the movable carrier relative to a predetermined stop position in accordance with the calculated position and inclination, for correcting the displacement by linearly running and rotating the movable carrier by the driving means on the basis of the amount of displacement so as to position the movable carrier at the predetermined stop position, and (e) supplying/receiving means provided on the carrier body, for transferring the cash between the movable carrier which is positioned at the predetermined stop position and the desired ATM, wherein the movable carrier has a cash holding section provided on the carrier body, for holding the cash therein, detecting means for detecting a position of the cash holding section relative to the insertion opening of the desired automatic teller machine, and position adjusting means provided on the carrier body, for adjusting the position of the cash holding section relative to the insertion opening of the desired automatic teller machine, and the control means includes means for operating the position adjusting means in accordance with the result of detection by the detecting means.

9. A cash transaction system comprising:

(A) a plurality of automatic teller machines (ATMs) installed side by side on an installation surface and each having a cash storage section for storing cash therein and an insertion opening through which the cash is supplied and discharged; and (B) a supplying/receiving device for supplying and receiving the cash to and from the ATMs, the supplying/receiving device including means for transmitting, over a wireless channel, an instruction signal for designating an ATM for cash receipt and delivery, and a movable carrier for supplying the cash to and receiving the cash from the designated ATM supplied in accordance with the instruction signal, and the movable carrier comprising:

(a) a carrier body for running on the installation surface along any path, without assistance of guides on the path, the carrier body having a pair of independently rotatable drive wheels, and driving means for rotating the drive wheels in the same direction to run the movable carrier in a linear way and for rotating the drive wheels in directions opposite to each other to rotate the movable carrier at a given position, (b) measuring means having a pair of distance measuring sensors which are arranged with a distance therebetween in a running direction of the carrier body and in a plane substantially perpendicular to the installation surface, for measuring distances between a measuring target surface and the respective distance measuring sections, (c) a cash holding section provided on the carrier body, for holding the cash therein, (d) supplying/receiving means provided on the carrier body, for transferring the cash between the cash holding section and the designated ATM through the insertion opening, and (e) control means for operating the driving means to run the movable carrier to a position facing the designated ATM, for calculating the position and inclination of the movable carrier relative to the designated ATM based on the distances measured by the measuring means, for detecting and amount of displacement of the movable carrier relative to a predetermined stop position in accordance with the calculated position and inclination, for correcting the displacement by linearly running and rotating the movable carrier by the driving means on the basis of the amount of displacement so as to position the movable carrier at the predetermined stop position, and for operating the supplying/receiving means in accordance with the instruction signal, wherein the movable carrier has detecting means for detecting a position of the cash holding section relative to the insertion opening of the designated ATM, and position adjusting means provided on the carrier body, for adjusting the position of the cash holding section relative to the insertion opening of the designated ATM, and the control means includes means for operating the position adjusting means in accordance with the result of detection by the detecting means.

10. A cash transaction system comprising:

(A) a plurality of apparatuses installed on an installation surface, for handling a medium; and (B) a supplying/receiving device for supplying and receiving the medium to and from the apparatuses, the supplying/receiving device including means for transmitting, over a wireless channel, an instruction signal for designating an apparatus for supplying and receiving the medium, and a movable carrier for running on the installation surface in accordance with the instruction signal and supplying and receiving the medium to and from the designated apparatus, wherein the movable carrier comprises:

(a) a carrier body having a pair of independently rotatable drive wheels, (b) driving means provided on the carrier body, for rotating the drive wheels in the same direction to run the movable carrier in a linear way and for rotating the drive wheels in directions opposite to each other to rotate the movable carrier at a given position, (c) measuring means having a pair of distance measuring sections which are arranged with a distance therebetween in a running direction of the carrier body and in a plane substantially perpendicular to the installation surface, for measuring distances between a measuring target surface and the respective distance measuring sections, (d) control means for operating the driving means to run the movable carrier to a position facing the designated apparatus, for calculating the position and inclination of the movable carrier relative to the designated apparatus based on the distances measured by the measuring means for detecting an amount of displacement of the movable carrier relative to a predetermined stop position in accordance with the calculated position and inclination, for correcting the displacement by linearly running and rotating the movable carrier by the driving means on the basis of the amount of displacement so as to position the movable carrier at the predetermined stop position, and (e) supplying/receiving means provided on the carrier body, for transferring the medium between the movable carrier which is positioned at the predetermined stop position and the designated apparatus, wherein the movable carrier has a medium holding section provided on the carrier body, for holding the medium therein, detecting means for detecting a position of the medium holding section relative to the insertion opening of the given apparatus, and position adjusting means provided on the carrier body, for adjusting the position of the medium holding section relative to the insertion opening of the given apparatus, and the control means includes means for operating the position adjusting means in accordance with the result of detection by the detecting means.

* * * * *